US011128777B2

(12) United States Patent
Sasaki et al.

(10) Patent No.: US 11,128,777 B2
(45) Date of Patent: Sep. 21, 2021

(54) RECORDING APPARATUS

(71) Applicant: SEIKO EPSON CORPORATION, Tokyo (JP)

(72) Inventors: Keisuke Sasaki, Matsumoto (JP); Toshio Miyake, Shiojiri (JP)

(73) Assignee: Seiko Epson Corporation, Tokyo (JP)

(*) Notice: Subject to any disclaimer, the term of this patent is extended or adjusted under 35 U.S.C. 154(b) by 5 days.

(21) Appl. No.: 16/856,333

(22) Filed: Apr. 23, 2020

(65) Prior Publication Data

US 2020/0344376 A1    Oct. 29, 2020

(30) Foreign Application Priority Data

Apr. 25, 2019    (JP) .............................. JP2019-084612

(51) Int. Cl.
| | | |
|---|---|---|
| *H04N 1/12* | (2006.01) | |
| *B41J 11/58* | (2006.01) | |
| *H04N 1/00* | (2006.01) | |
| *G06F 3/12* | (2006.01) | |

(52) U.S. Cl.
CPC .............. *H04N 1/121* (2013.01); *B41J 11/58* (2013.01); *H04N 1/00535* (2013.01); *H04N 1/00551* (2013.01)

(58) Field of Classification Search
CPC . B41J 11/58; B41J 29/02; B41J 29/13; B65H 1/02; B65H 2402/441; B65H 2402/45; B65H 2405/324; B65H 2407/21; B65H 2801/06; B65H 2801/39; H04N 1/121; H04N 1/00519; H04N 1/00522; H04N 1/00525; H04N 1/00527; H04N 1/0053; H04N 1/00533; H04N 1/00551; H04N 1/00544

USPC ......................................... 358/498, 496, 474
See application file for complete search history.

(56) References Cited

U.S. PATENT DOCUMENTS

| | | | |
|---|---|---|---|
| 2007/0001382 A1* | 1/2007 | Matsumoto | B65H 1/02 271/162 |
| 2015/0077815 A1* | 3/2015 | Okazawa | H04N 1/0402 358/474 |
| 2015/0091241 A1* | 4/2015 | Wakakusa | B65H 3/44 271/9.07 |
| 2015/0091247 A1* | 4/2015 | Iijima | B65H 1/04 271/264 |
| 2017/0126920 A1* | 5/2017 | Tsukamoto | B41J 29/393 |
| 2017/0251115 A1* | 8/2017 | Miyamoto | H04N 1/0057 |
| 2018/0034986 A1* | 2/2018 | Ishida | H04N 1/00551 |

(Continued)

FOREIGN PATENT DOCUMENTS

JP    2007-008651 A    1/2007

*Primary Examiner* — Chad Dickerson
(74) *Attorney, Agent, or Firm* — Workman Nydegger

(57) ABSTRACT

A recording apparatus includes a medium mounting section, a feed mechanism, a recording section, a housing, and a reading unit. The reading unit is provided on top of the housing and includes a document feed opening, a transport section, and a reading section. A back cover moves in tandem with a mounting tray, and moves to a closed position in which the back cover covers the opening when the mounting tray is closed and an open position in which the back cover does not prevent the mounting tray from rotating for stowage in the opening when the mounting tray is open. When in the closed position, the mounting tray covers the document feed opening of the reading unit.

12 Claims, 15 Drawing Sheets

(56) References Cited

U.S. PATENT DOCUMENTS

2018/0034989 A1* 2/2018 Fujibayashi ....... G03G 21/1633
2020/0369058 A1* 11/2020 Sasaki ................... B41J 13/103
2020/0406624 A1* 12/2020 Miyasaka .......... H04N 1/00992

* cited by examiner

RECORDING APPARATUS

The present application is based on, and claims priority from JP Application Serial Number 2019-084612, filed Apr. 25, 2019, the disclosure of which is hereby incorporated by reference herein in its entirety.

BACKGROUND

1. Technical Field

The present disclosure relates to a recording apparatus including a medium mounting section on which a medium is mounted, a feed mechanism that feeds a medium mounted on the medium mounting section, and a recording section that performs recording on a medium fed by the feed mechanism.

2. Related Art

Conventionally, as a recording apparatus of this type, there has been known a recording apparatus including: a medium mounting section on which a medium such as a sheep of paper is mounted; a feed mechanism that feeds a medium mounted on the medium mounting unit; and a recording head (which is an example of the recording section) that performs recording on a medium fed by the feed mechanism, wherein the recording head records an image or the like on a medium such as a sheet of paper. For example, a recording apparatus disclosed in JP-A-2007-8651 has a paper feed device (which is an example of the feed mechanism) including a paper feed tray (which is an example of the mounting tray) supported in such a manner as to be able to openably and closably rotate on a shaft extending across the width of a sheet. With a bundle of sheets loaded on the paper feed tray, the feed device feeds the sheets one by one to an image forming section (which is an example of the recording section), starting from the uppermost sheet. As just described, the recording apparatus is provided with a tilting type paper feed tray.

When the recording apparatus is in use, the paper feed tray constitutes a loading surface on which a sheet is loaded. When in use, the paper feed tray is disposed in such a posture as to be tilted backward obliquely upward from an upper end of a housing in which a rotating shaft of the paper feed tray is located. Further, when not in use, the paper feed tray is compactly stowed, covering a paper feed opening.

However, in consideration of the degree of freedom in layout or design of the feed mechanism in the housing including a paper feed roller, there is a case where the paper feed tray needs to be disposed on a lower level than an upper surface of the housing when the paper feed tray is open. When the recording apparatus described in JP-A-2007-8651 is configured such that the paper feed tray is disposed on a lower level than the upper surface of the housing when the paper feed tray is open, the housing needs to be extended to a larger size so as to be able to contain a portion of the paper feed tray located on a lower level than the upper surface of the housing. In this case, the recording apparatus becomes larger in size in the direction of depth thereof. Meanwhile, if, in the recording apparatus, a feed opening, an ejection opening, or other openings are kept open when the recording apparatus is not in use, dust tends to enter the housing through an opening of this type or other openings. Adhesion to a medium or the recording section of dust having entered the housing might invite a defect in recording.

SUMMARY

According to an aspect of the present disclosure, there is provided a recording apparatus including: a medium mounting section on which a medium is mounted; a feed mechanism that feeds the medium through a feed opening; a recording section that performs recording on the medium fed by the feed mechanism; a housing that accommodates the feed mechanism and the recording section; a reading unit, provided on top of the housing, that includes a document feed opening, a transport section that takes in a document from the document feed opening and transports the document, and a reading section that reads a document being transported; a mounting tray that constitutes the medium mounting section, the mounting tray being configured to rotate between a closed position in which the mounting tray covers the feed opening and an open position in which the mounting tray is configured to have the medium mounted thereon; an opening, bored in a side surface of the housing located upstream in a transport direction of a medium, in which the mounting tray is stowed when the mounting tray is in the open position; and a cover, configured to move in tandem with the mounting tray, that moves to a closed position in which the cover covers the opening when the mounting tray is closed and an open position in which the cover does not prevent the mounting tray from rotating for stowage in the opening when the mounting tray is open, wherein when in the closed position, the mounting tray is disposed in a state of covering the document feed opening of the reading unit.

DESCRIPTION OF EXEMPLARY EMBODIMENTS

Figure 1:
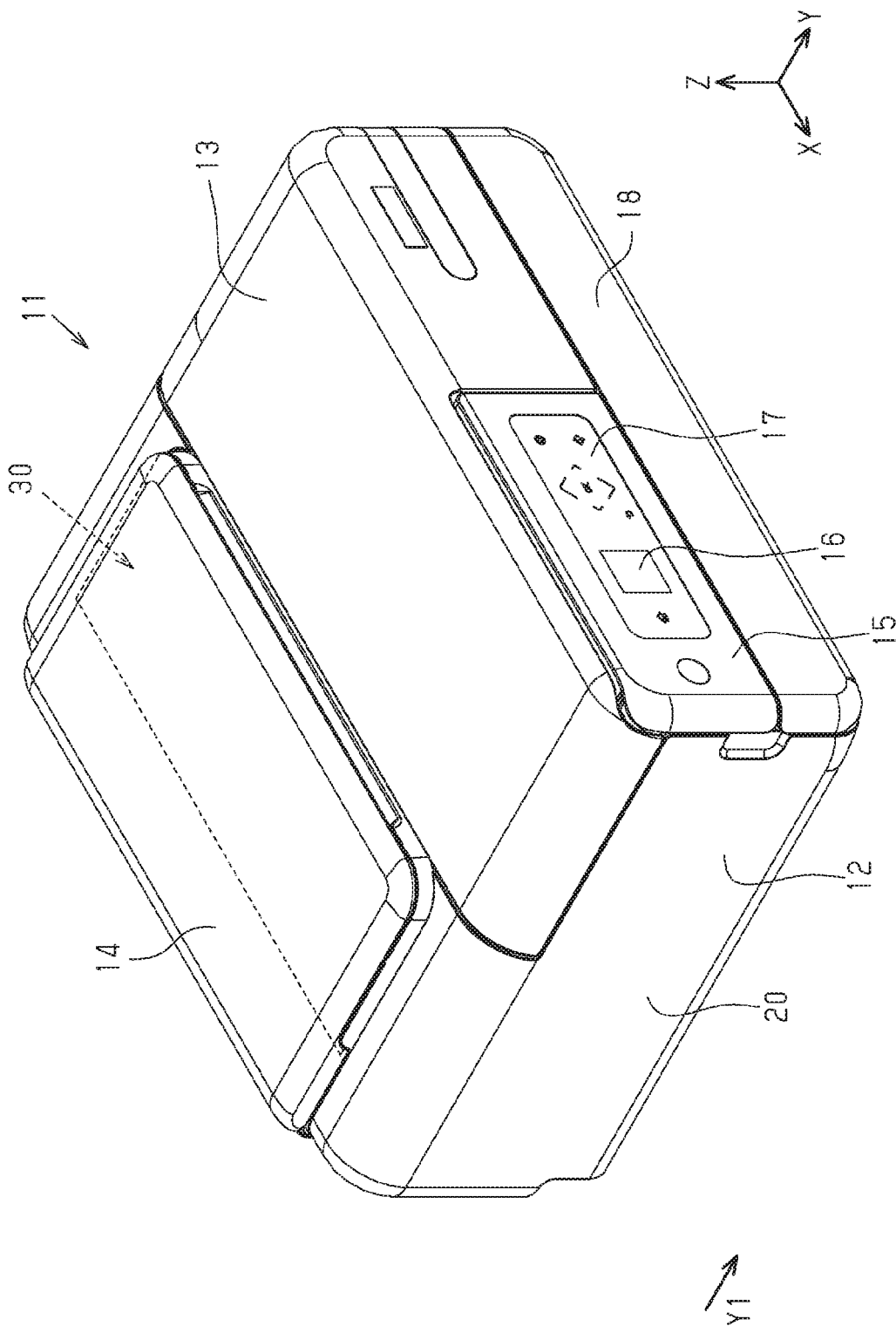
FIG. 1 is a perspective view showing a recording apparatus according to an embodiment.

An embodiment of a recording apparatus is described below with reference to the drawings. FIG. 1 assumes that a recording apparatus 11 is placed on a horizontal surface and three imaginary lines that are orthogonal to one another are an X axis, a Y-axis, and a Z axis. The X axis is an imaginary line that is parallel to a scanning direction of the after-mentioned recording head, and the Y axis is an imaginary line that is parallel to a transport direction Y1 of a medium during recording. Further, the Z axis is an imaginary line that is parallel to a vertical direction. The recording apparatus 11 shown in FIG. 1 has its front located downstream in the transport direction Y1 and has its back located upstream in the transport direction Y1.

The recording apparatus 11 shown in FIG. 1 is a serial-recording ink jet printer. The recording apparatus 11 includes a cuboidal housing 12. The recording apparatus 11 is for example a multifunction printer and includes a recording unit 20 that occupies a large portion of the housing 12 and a reading unit 30 assembled to a part of the head of the housing 12. In this example, the recording apparatus 11, which is a multifunction printer, has an ink-jet print function, a scan function with which the reading unit 30 reads a document, and a copy function with which the recording unit 20 prints an image of a document read by the reading unit 30. The housing 12 is made, for example, of synthetic resin and is in a state of covering a frame made of metal and various types of components or other components assembled to the frame.

The housing 12 includes a maintenance cover 13, located in the front of an upper surface of the housing 12, that is opened and closed by rotating on a rotating shaft at a back end thereof. By opening the maintenance cover 13, a user performs maintenance work including a jamming-eliminating task of removing a medium M at the onset of jamming and an ink-refilling task.

Provided in the rear of the upper surface of the housing 12 is a mounting tray 14 serving as both a medium support that supports a medium M such as a sheet of paper and a top cover that covers a part of the upper surface of housing 12. The mounting tray 14 is opened and closed by rotating frontward and rearward on a rotating shaft at a back end of thereof. In FIG. 1, the mounting tray 14 is stowed in a closed position in which the mounting tray 14 covers the reading unit 30. The mounting tray 14 is disposed in such a posture as to tilt backward at a predetermined angle and used as a medium support on which a medium M to be subjected to recording is mounted (see FIG. 3). That is, when in the closed position, the mounting tray 14 has a cover function of covering a portion of the reading unit 30 that is exposed on the upper surface of the housing 12 and, when in an open position, the mounting tray 14 has a medium support function of having mounted thereon a medium M to be subjected to recording.

Provided on the front of the hosing 12 is an operation panel 15. The operation panel 15 includes a display section 16 on which a menu, a message, and the like are displayed and an operation section 17 composed of a plurality of switches that are operated by a user in giving instructions to the recording apparatus 11. The operation section 17 includes a power switch, selection switches that are operated in selecting items on a menu displayed on the display section 16, and operation switches such as a print start switch and a copy start switch. The display section 16 is composed of a liquid crystal display or other components. The display section 16 may be a touch panel so that an operation function of the display section 16 may serve also as a part of the operation section 17.

Provided in a place on the front of the housing 12 that is lower than the operation panel 15 is a lid 18 that is opened and closed by rotating on a rotating shaft at a lower end thereof. Opening the lid 18 exposes an ejection opening 64 through which a medium M subjected to recording is ejected and an ejection tray 65 stowed in the housing 12 (both shown in FIG. 8). The ejection tray 65 is slid and drawn out by a user for use so that a medium M subjected to recording and ejected from the ejection opening 64 is loaded onto the ejection tray 65.

Figure 2:
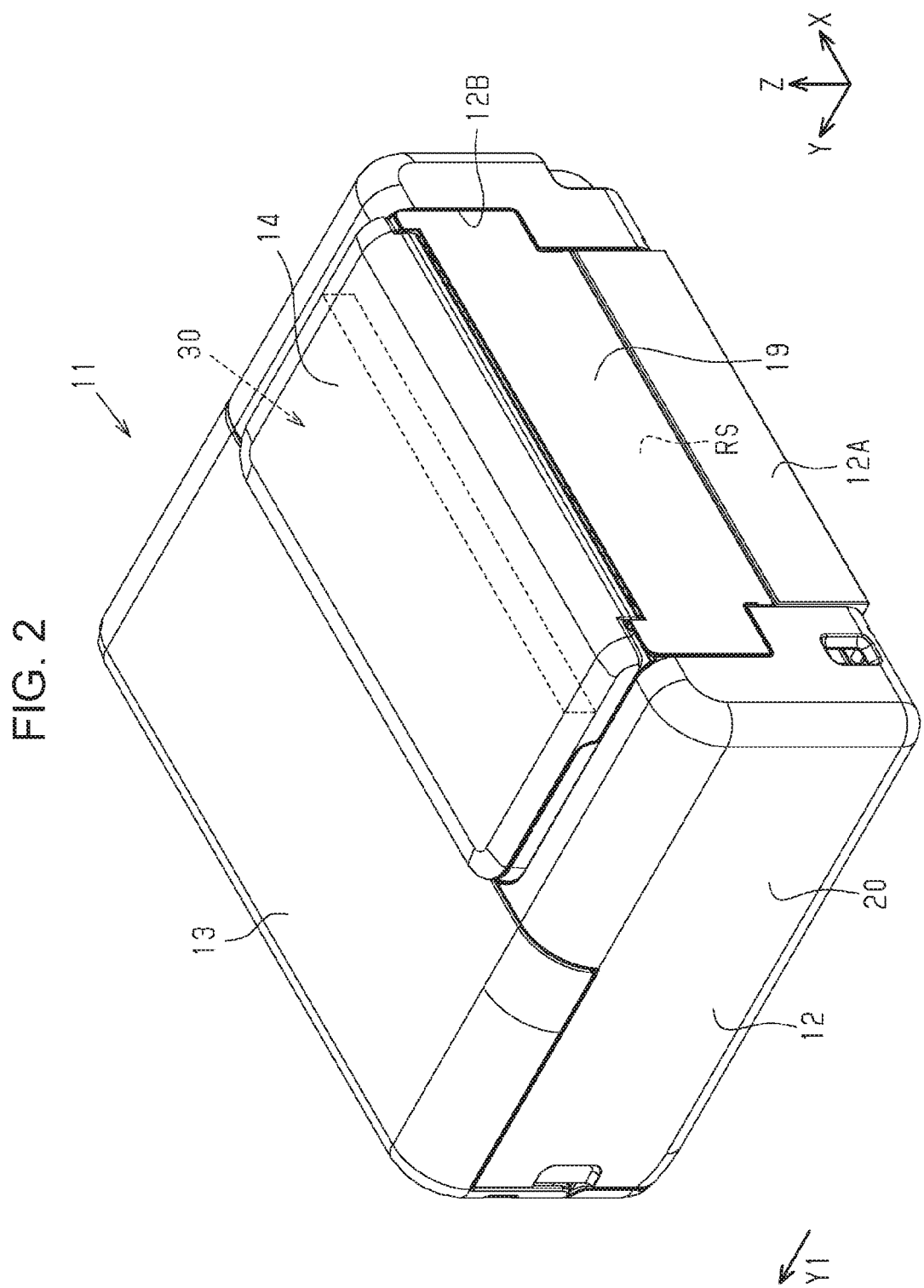
FIG. 2 is a perspective view of the recording apparatus as seen from behind.

As shown in FIG. 2, a back cover 19 serving as an example of the cover is provided at the back of the recording apparatus 11. The back cover 19 opens and closes by rotating frontward and rearward on a rotating shaft at a lower end thereof. The back cover 19 opens and closes in tandem with the opening and closing of the mounting tray 14. The back cover 19 is provided so as to cover an opening 12B that, when the mounting tray 14 is in the closed position, is formed between the mounting tray 14 and a back plate section 12A constituting a lower part of a back surface of the housing 12.

Figure 3:
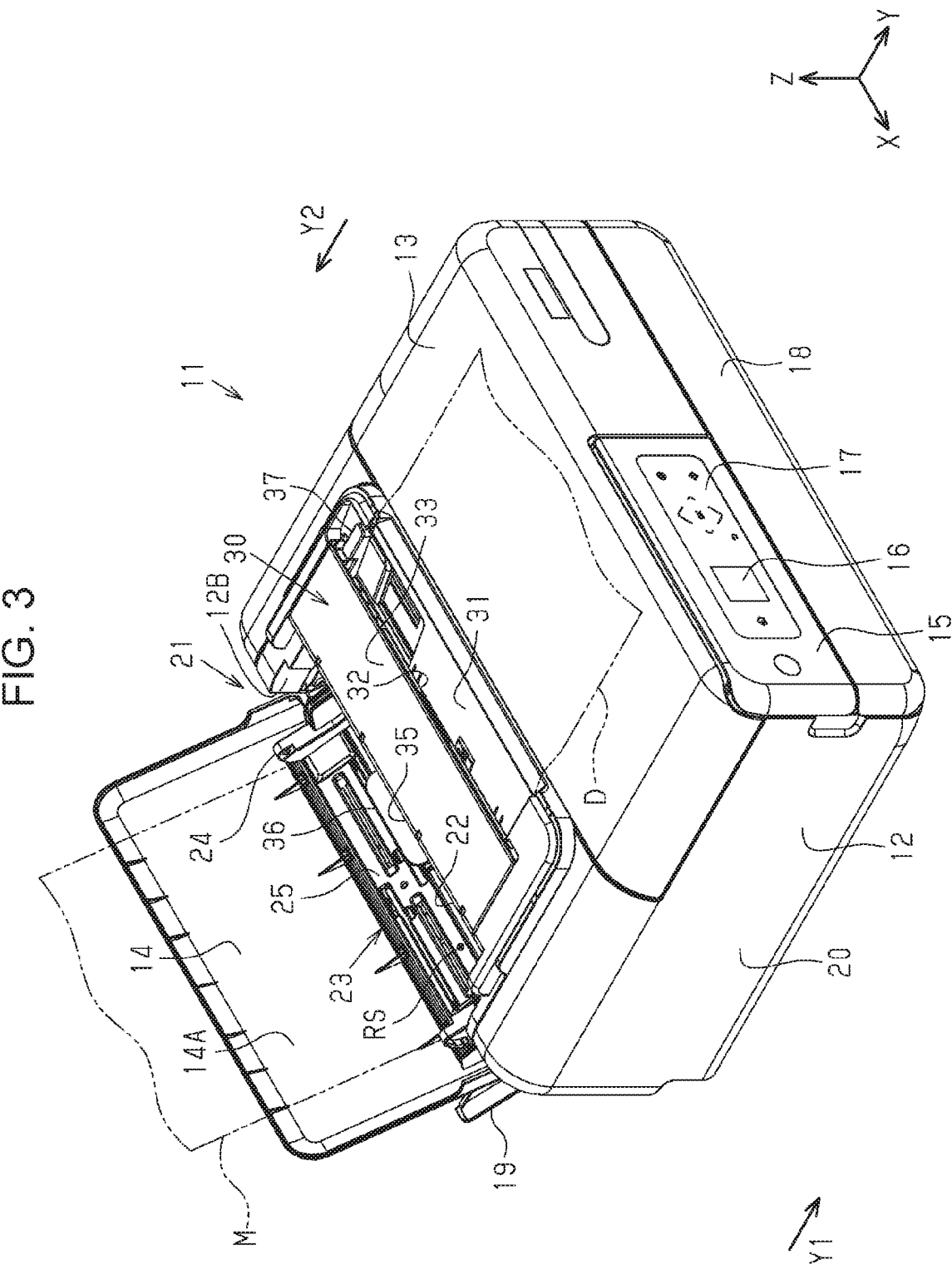
FIG. 3 is a perspective view of the recording apparatus with its mounting tray in an open position.
Figure 4:
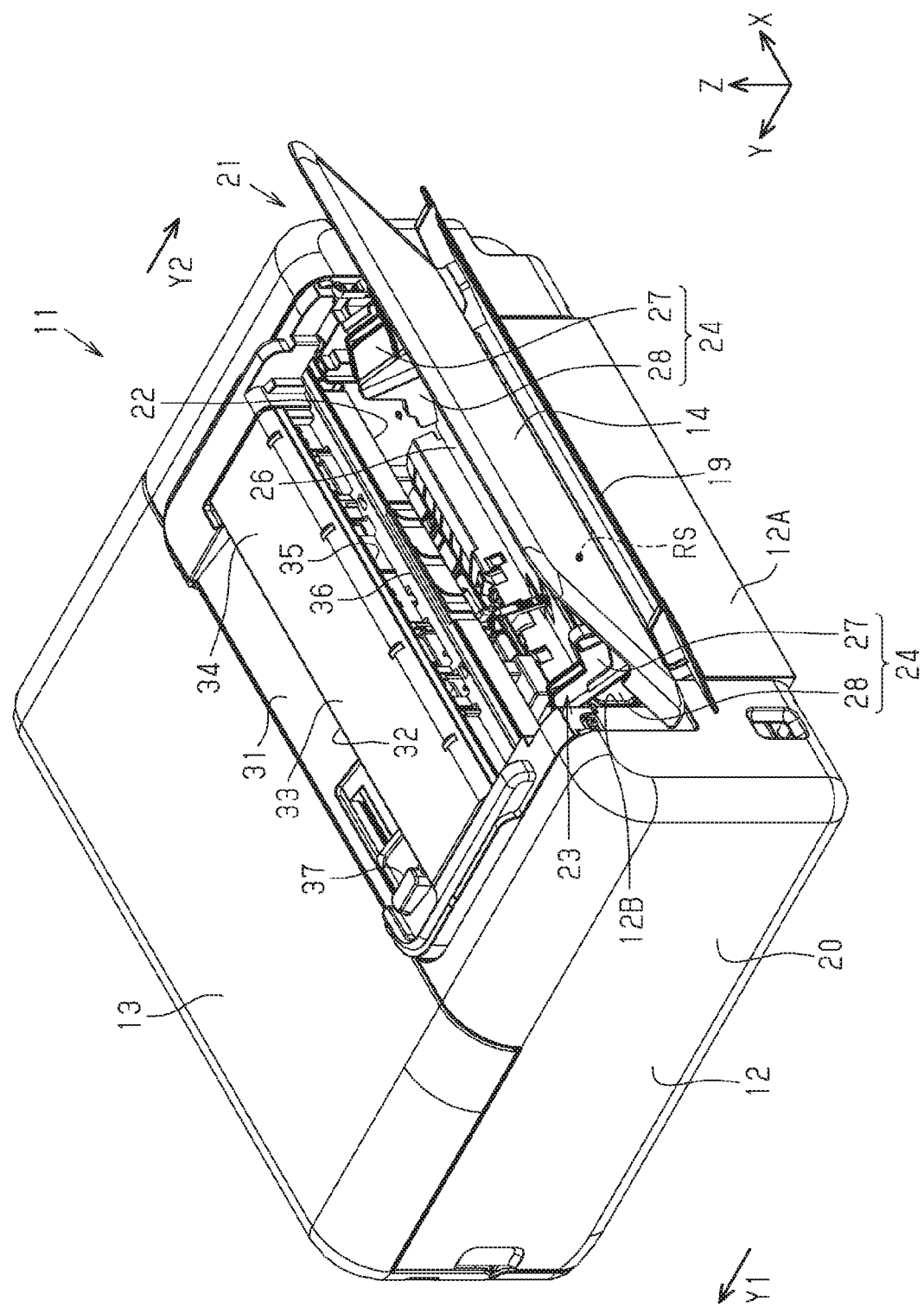
FIG. 4 is a perspective view of the recording apparatus as seen from behind with its mounting tray in the open position.

FIGS. 3 and 4 show the recording apparatus 11 with the mounting tray 14 in an open state. As shown in FIG. 4, the housing 12 has a notched opening 12B (also see FIGS. 11 and 12), bored in one side surface (back surface) located upstream in the transport direction Y1, in which the mounting tray 14 is stowed when the mounting tray 14 is in the open position. As shown in FIGS. 3 and 4, when the mounting tray 14 is in an open state, the mounting tray 14 is disposed in such a posture as to be tilted backward at a predetermined angle in a state of being stowed in the opening 12B. When the mounting tray 14 is in an open state, a medium mounting section 21 is exposed. On the medium mounting section 21, a medium M is mounted. The medium mounting section 21 includes the mounting tray 14, which functions as a medium support that supports a medium M in an open state. As shown in FIG. 3, the mounting tray 14 has its inner surface serving as a mounting surface 14A on which a medium M is mounted. Further, as shown in FIG. 4, the back cover 19 moves in tandem with the mounting tray 14. Specifically, when the mounting tray 14 is closed, the back cover 19 moves to a closed position in which the back cover 19 covers the opening 12B, and when the mounting tray 14 is open, the back cover 19 moves to an open position in which the back cover 19 does not prevent the mounting tray 14 from rotating for stowage in the opening 12B.

Further, as shown in FIG. 3, when the mounting tray 14 is in an open state, a feed opening 22 through which a medium M is fed into the housing 12 is exposed. On the mounting surface 14A of the mounting tray 14, one or more media M indicated by chain double-dashed lines in FIG. 3 can be mounted. Provided at the base of the inner surface of the mounting tray 14 is a positioning mechanism 23 that effects widthwise positioning of a medium M mounted on the mounting surface 14A. The positioning mechanism 23 includes a pair of edge guides 24 that are operated by a user in effecting widthwise positioning of a medium M mounted on the mounting surface 14A of the mounting tray 14 and an interlocking mechanism 25 that moves the pair of edge guides 24 widthwise in an interlocked fashion. When a user operates one of the two edge guides 24, the interlocking mechanism 25 interlocks the other edge guide 24 so that the other edge guide 24 moves in a direction opposite to the direction of operation. That is, when a user performs an operation of moving one edge guide 24 in such a direction as to narrow the spacing between the two edge guides 24, the other edge guide 24 moves the same distance in such a direction as to narrow the spacing. Further, when a user performs an operation of moving one edge guide 24 in such a direction as to widen the spacing between the two edge guides 24, the other edge guide 24 moves the same distance in such a direction as to widen the spacing. This allows a medium M, regardless of its widthwise size, to be positioned by the pair of edge guides 24 into an appropriate feed position where the width center of the medium M is aligned with the width center of the feed opening 22.

As shown in FIG. 4, the medium mounting section 21 includes a hopper 26 on which a portion of a medium M mounted on the mounting surface 14A of the mounting tray 14 located downstream in a feed direction is mounted. The hopper 26 is swingably provided so that a portion of a mounted medium M located downstream in the feed direction can be moved nearer to and away from the aftermentioned feed roller 51. The hopper 26 is provided so that a medium M mounted on the medium mounting section 21 can be mounted on the hopper 26, and is configured to be swingable between a feed position in which a medium M is in contact with the feed roller 51 and a retreat position in which a medium M is out of contact with the feed roller 51. Before feeding, the hopper 26 is disposed in the retreat position, in which a medium M is out of contact with the feed roller 51, and during feeding, the hopper 26 is disposed in the feed position, in which a medium M is in contact with the feed roller 51. When in the retreat position, the hopper 26 has an angle of inclination which is substantially the same as that which the mounting tray 14 has when the mounting tray 14 is in an open state. A medium M mounted on the mounting tray 14 is fed into the housing 12 through the feed opening 22 by the feed roller 51 rotating with the hopper 26 tilted to the feed position. The mounting tray 14 is provided so as to be rotatable between the closed position, in which the mounting tray 14 is stowed in a state of covering the feed opening 22 of a feed mechanism 50, and the open position, in which the mounting tray 14 is in a backward tilting posture in which, together with the hopper 26, the mounting tray 14 allows mounting of a medium M.

Each of the edge guides 24 of the present embodiment is composed of two components. That is, each of the edge guides 24 is composed of a first edge guide 27 provided on the mounting tray 14 so as to be movable across the width of a medium M and a second edge guide 28 provided on the hopper 26. The first edge guide 27, which is provided on the mounting tray 14 so as to be movable across the width of a medium M, effects widthwise positioning of a medium M mounted on the mounting tray 14. The second edge guide 28, which is provided on the hopper 26, engages with the first edge guides 27 in a state of being able to move widthwise together with the first edge guide 27 and being able to rotate relative to the first edge guide 27 as the mounting tray 14 rotates. The first edge guide 27 and the second edge guide 28 engage with each other in a state of being able to move widthwise together with each other and being able to rotate relative to each other as the mounting tray 14 rotates.

Further, as shown in FIGS. 3 and 4, rotating the mounting tray 14 into an open state exposes the reading unit 30. The reading unit 30 is located at the rear of the upper surface of the housing 12 anterior to the feed opening 22 and has a width dimension which is slightly shorter than that of the housing 12. The width dimension of the reading unit 30 is slightly longer than the maximum widthwise size of a document D, i.e. a target of reading, so that the document D can be read.

As shown in FIGS. 3 to 6, the reading unit 30 of the present embodiment is of a sheet-feed type that has a function of transporting a document D and reads the document D while the document D is being transported. The reading unit 30 includes a document mounting section 31 on which to mount a document D to be read, a document feed opening 32 through which the document D is fed, a transport section 33 that transports the document D, a reading section 34 (scanner section) that reads the document D thus transported, a document ejection opening 35 through which the document D thus read is ejected, and a guide section 36 that guides the direction of ejection of the document D thus ejected from the document ejection opening 35.

As shown in FIGS. 3 to 6, the document mounting section 31 is provided with a document edge guide 37 that is operated by a user to effect widthwise positioning of the document D. The edge guide 37 is assembled to a widthwise end of the document mounting section 31 so as to be movable widthwise along a guide section 31A (see FIGS. 5 and 6). In this example, the document mounting section 31 is of a one-sided feed type in which a document D is put to one side widthwise for positioning. A user effects positioning by sliding the edge guide 37 with the edge guide 37 in touch with one side edge of a document D and putting the document D to one side widthwise with the other side edge pressed against a reference surface. Alternatively, the document mounting section 31 may be of a center-feed type provided with a pair of document edge guides 37 to effect widthwise positioning of a document D with reference to the width center.

In the reading unit 30 shown in FIGS. 3 to 6, a document D positioned by the document edge guide 37 is transported by the transport section 33 and read by the reading section 34. The document D is transported in a second transport direction Y2 opposite to the transport direction Y1 of a medium M in the recording unit 20. A read document D transported by the transport section 33 from the document feed opening 32 and read by the reading section 34 while being transported is ejected from the document ejection opening 35. The guide section 36 guides the document D ejected from the document ejection opening 35 obliquely upward slightly above the horizontal. The document D thus ejected is ejected onto the mounting tray 14 when the mounting tray 14 is in the open position.

In the recording apparatus 11 of the present embodiment, the transport direction Y1, in which a medium M mounted on the mounting tray 14 is transported, and the second transport direction Y2, in which a document D mounted on the document mounting section 31 is transported, are opposite to each other. In a region upstream of the document mounting section 31 in the second transport direction Y2, the maintenance cover 13 is disposed. For this reason, an upper surface of the maintenance cover 13 is utilized as a part of a mounting surface on which to mount a document D. Further, since the transport direction of a medium M and the transport direction of a document D are opposite to each other, the document ejection opening 35 faces the mounting tray 14 when the mounting tray 14 is in the open position. As a result, the mounting tray 14 is utilized as an ejection tray for a document D.

The guide section 36, located in the vicinity facing the document ejection opening 35, extends obliquely upward so that a document D ejected from the document ejection opening 35 can be guided obliquely upward slightly above the horizontal. The obliquely upward guidance by the guide section 36 of the document D thus ejected prevents contact with the pair of edge guides 24 and prevents entry into the feed opening 22 of a downwardly-curved leading end of the document D thus ejected. For example, since contact with the edge guides 24 of the document D thus ejected makes the posture of the document D uncontrollable, the document D is guided upward by the guide section 36 so as not to touch the first guide edges 27. Further, the guide section 36 brings about an effect of reducing the angle of entry at which the leading end of the document D enters onto the mounting surface 14A of the mounting tray 14 when the mounting tray 14 tilts backward at a predetermined angle. This makes it possible to load the document D onto the mounting tray 14 without disarray even when the mounting tray 14 is utilized as an ejection tray for the document D.

In addition to the sheet-feed reading unit 30 of the present embodiment, a flat-bed reading unit may be separately provided. The flat-bed reading unit includes a document platen and a document platen cover and reads a document D set on the document platen. In this case, the sheet-feed reading unit 30 needs only be mounted on top of the document platen cover, and the mounting tray 14 needs only be configured to close in a state of covering the reading unit 30 on top of the document platen cover.

As shown in FIG. 2, in a state where the mounting tray 14 is stowed in the closed position, in which the mounting tray 14 assumes a horizontal posture, the back cover 19 is in the closed position, in which the back cover 19 assumes an upright posture. As shown in FIG. 4, when the mounting tray 14 is in the open position, in which the mounting tray 14 assumes a backward tilting posture, the back cover 19 is in the open position, in which the back cover 19 is tilted backward. In a process by which a user rotates the mounting tray 14 from the closed position shown in FIG. 2 to the open position shown in FIG. 4, the back cover 19 rotates in an opening direction in an interlocked fashion to be disposed in the open position shown in FIG. 4 out of the closed position shown in FIG. 2. As a result, in the process by which the mounting tray 14 rotates from the closed position shown in FIG. 2 to the open position shown in FIG. 4, the back cover 19 tilts backward to the open position, whereby the opening 12B is formed in the back surface of the housing 12, and the mounting tray 14 rotates in an opening direction while lowering a base end section of the mounting tray 14 through the opening 12B. Moreover, by a user performing an operation of rotating the mounting tray 14 from the open position to the closed position, the opening 12B, which exposes a rear space RS of the housing 12, is covered by the back cover 19, which has returned to the closed position. For this reason, when the mounting tray 14 is in the closed position, the rear space RS of the housing 14 is covered by the back cover 19 without being exposed. This prevents entry of dust into the housing 12 through the opening 12B.

Figure 5:
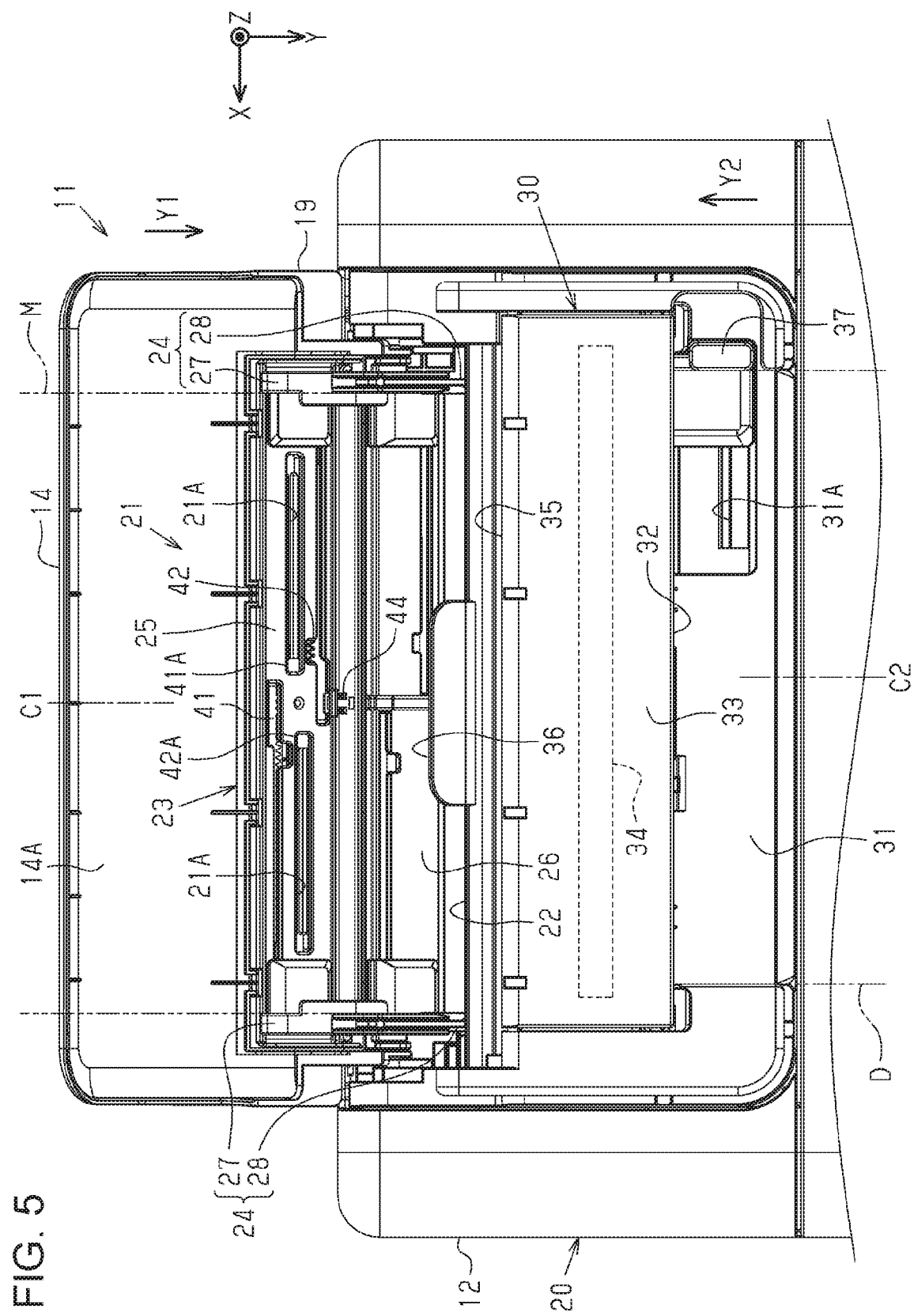
FIG. 5 is a plan view of the recording apparatus with its mounting tray in the open position.
Figure 6:
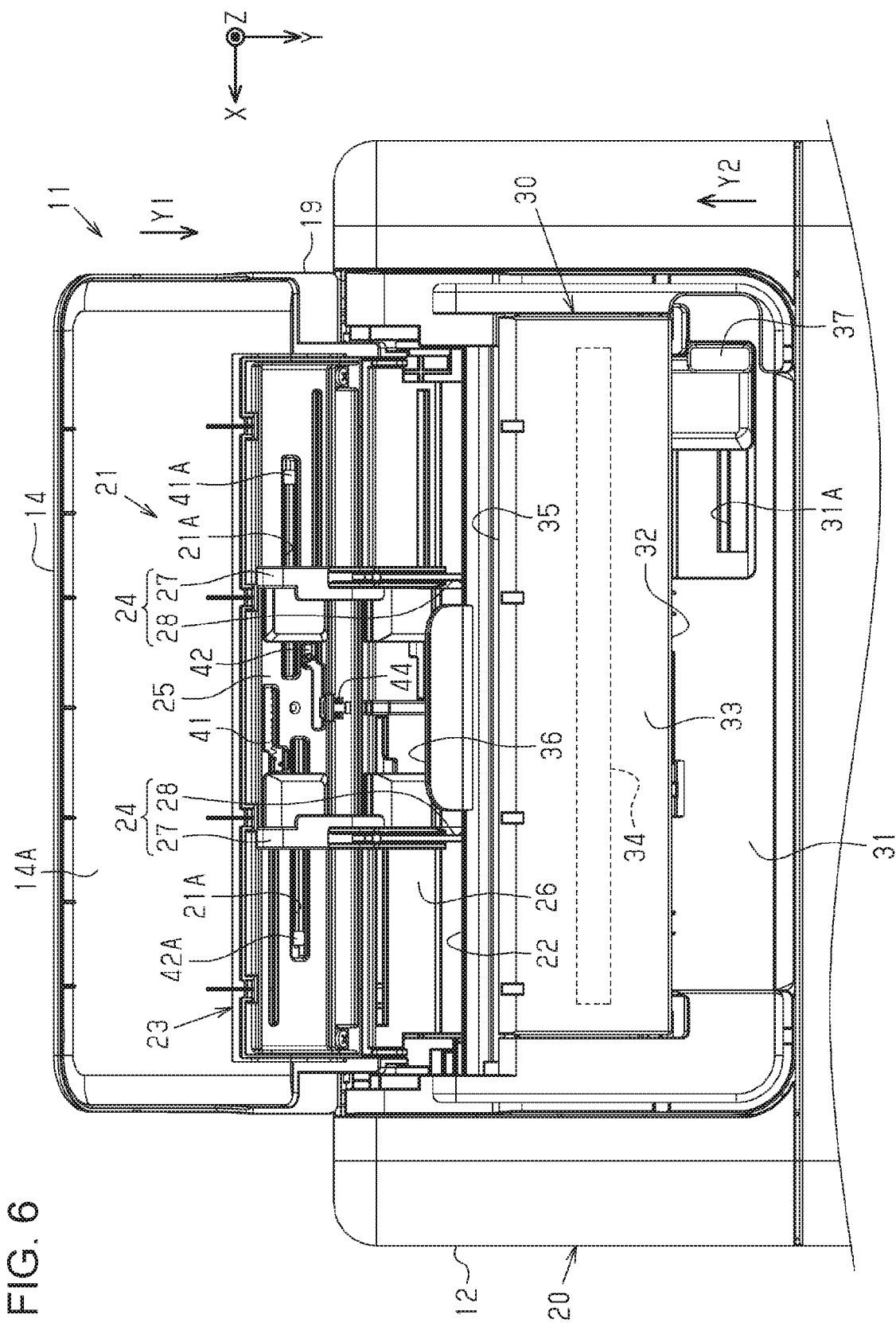
FIG. 6 is a plan view of the recording apparatus with its mounting tray in the open position and its edge guides in such a position as to be able to guide a medium of the minimum width.
Figure 7:
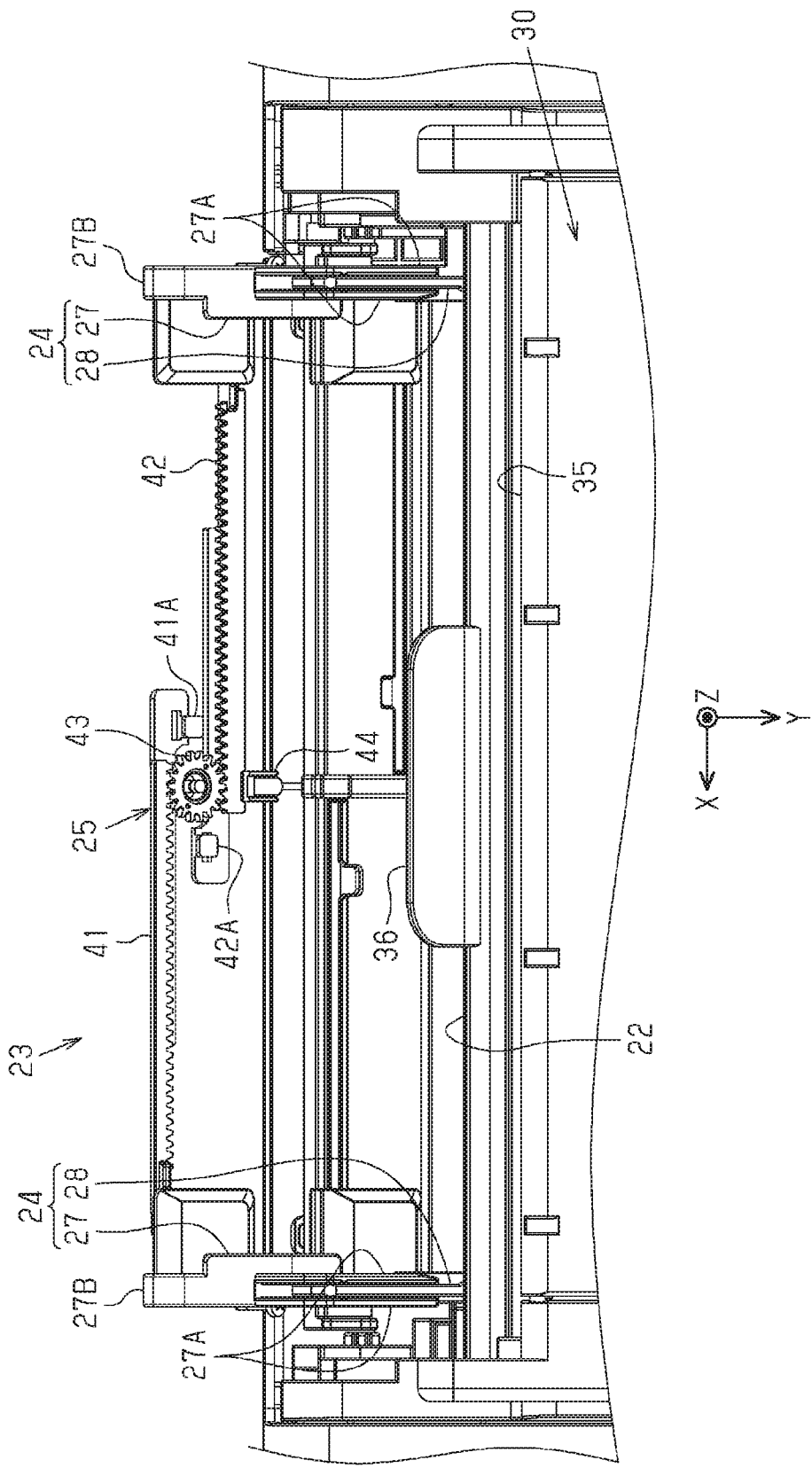
FIG. 7 is a plan view showing a positioning mechanism.

As shown in FIGS. 5 and 6, the interlocking mechanism 25, which moves the pair of edge guides 24 widthwise in an interlocked fashion by means of the interlocking mechanism 25, includes guide holes 21A that slidably guide the pair of edge guides 24 widthwise and engaging sections 41A and 42A fitted in the guide holes 21A so as to be able to move together with the pair of edge guides 24 and move widthwise. Further, as shown in FIGS. 5 to 7, the interlocking mechanism 25 has a rack-and-pinion mechanism including a pair of racks 41 and 42 extending widthwise from the pair of edge guides 24, respectively, and a pinion 43, disposed between the two racks 41 and 42, that meshes with the two racks 41 and 42.

The pair of edge guides 24 are movable widthwise in a range between a first position where they are placed at a spacing of the maximum width shown in FIG. 5 and a second position where they are placed at a spacing of the minimum width shown in FIG. 6. As shown in FIG. 6, the guide section 36 is located in a region between the two edge guides 24 in the second position where they are placed at a spacing of the minimum width.

As shown in FIG. 5, when a medium M of the maximum width has been guided by the pair of edge guides 24, the mounting tray 14 has such a width dimension as to be able to support the entire width of the medium M. For example, when the maximum size of a medium M is A4 size, the mounting tray 14 has a width dimension which is longer than that of size A4 paper. Further, when the maximum size is A3 size, the mounting tray 14 has a width dimension which is longer than that of size A3 paper. Further, the maximum size of a medium M on which the recording unit 20 performs recording and the maximum size of a document D to be read by the reading unit 30 are equal to each other. As noted previously, the mounting tray 14 serves also as a cover that covers the reading unit 30 when the recording apparatus 11 is not in use. Therefore, the mounting tray 14 has such a width dimension as to be able to cover the document feed opening 32 and the document ejection opening 35 over the entire widths of them.

In the present embodiment, the feed opening 22, the document feed opening 32, and the document ejection opening 35 are located in substantially the same range of positions widthwise. In other words, a width center position C1 of the feed opening 22 and a width center position C2 of the document feed opening 32 and the document ejection opening 35 are substantially aligned with each other. In the present embodiment, the substantial alignment of the width center position C1 and the width center position C2 with each other means that an amount of misregistration between the width center position C1 and the width center position C2 is equal to or smaller than $\frac{1}{5}$ of each of the maximum width dimensions of a medium M and a document D. For this reason, while the mounting tray 14 has both a support function with which it can support a medium M of the maximum width over the entire width and a cover function of covering the entire widths the document feed opening 32 and document ejection opening 35 of the reading unit 30, the mounting tray 14 has its width dimension kept relatively short. In the example shown in FIG. 5, the amount of misregistration between the width center position C1 and the width center position C2 is equal to or smaller than $\frac{1}{10}$ of each of the maximum width dimensions of a medium M and a document D. Alternatively, in a case where the maximum width of a medium M that is handled by the recording unit 20 and the maximum width of a document D that is handled by the reading unit 30 are different from each other, the substantial alignment of the width center position C1 and the width center position C2 with each other means that the amount of misregistration is equal to or smaller than $\frac{1}{5}$ of the maximum width dimension of that one of the medium M and the document D which is smaller in maximum width than the other.

Further, as shown in FIGS. 5 to 7, the medium mounting section 21 includes a load section 44 that applies a load that serves as resistance to the movement of the pair of edge guides 24. In particular, the load section 44 is provided in the mounting tray 14 and applies a load that serves as resistance to the movement of the first edge guides 27. A reason for this is that without a predetermined or heavier resistance load on the pair of edge guides 24, oblique passage of a medium M held between the two edge guides 24 might be allowed due to widthwise displacements of the edge guides 24 when the medium M is subjected to a transverse force while being fed. Oblique passage of this type is reduced by the load section 44 applying a resistance load to the pair of edge guides 24. The load section 44 of the present embodiment is composed of a pressing section that presses one of the two racks 41 and 42, between which the pinion 43 is held, in such a direction as to press the rack against the pinion 43. The load section 44 applies a load resistance to the pair of edge guides 24 by enhancing the pressure of meshing between the pair of racks 41 and 42 and the pinion 43 by utilizing an elastic force of a spring or piece of rubber to press one of the racks 41 and 42 against the pinion 43.

Each of the first edge guides 27 includes a pair of clamping sections 27A facing each other at a predetermined spacing, and an upstream end of the corresponding second edge guide 28 is held between the two clamping sections 27A, whereby the two clamping sections 27A are engaged so as to be rotatable relative to each other. Further, when the mounting tray 14 is in the open position, each of the first edge guides 27 includes an extension section 27B extending upstream of the clamping sections 27A in the feed direction. In this example, when the mounting tray 14 is disposed in the closed position and the first edge guides 27 are stowed in the housing 12, the extension sections 27B are extended to such an extent as not to interfere with other components in the housing 12.

Figure 8:
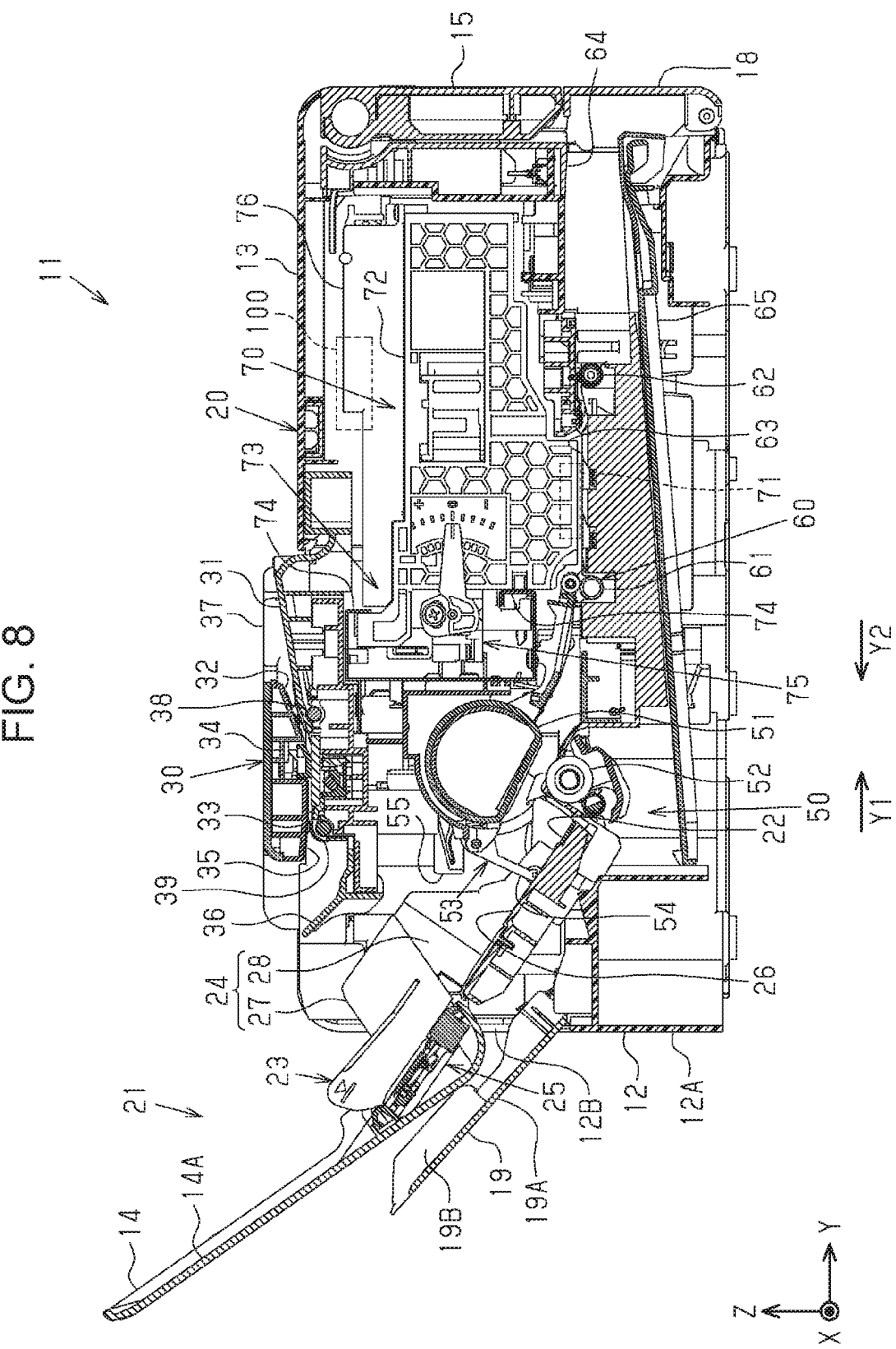
FIG. 8 is a sectional side view showing the recording apparatus.

Next, a configuration of the recording apparatus 11 is described with reference to FIG. 8. FIG. 8 shows a side cross-section of the recording apparatus 11. In FIG. 8, the mounting tray 14 is in the open position.

As shown in FIG. 8, the recording unit 20 includes the medium mounting section 21, on which a medium M is mounted, the feed mechanism 50, which feeds a medium M, a transport mechanism 60 that transports a medium M that has been fed, and a recording section 70 that performs recording on a medium M. The housing 12 accommodates the feed mechanism 50, the transport mechanism 60, and the recording section 70.

The feed mechanism 50 shown in FIG. 8 fees a medium M (see FIG. 3) mounted on the medium mounting section 21. The feed mechanism 50 includes the aforementioned hopper 26, the aforementioned feed roller 51, and a retard roller 52. The feed roller 51 feeds one by one a plurality of media M mounted on the mounting tray 14 and the hopper 26, starting from the uppermost medium M. The retard roller 52 is located below and faces the feed roller 51. Further, the feed mechanism 50 includes a medium detector 53 that detects the presence or absence of a medium M mounted on the medium mounting section 21. In this example, the medium detector 53 detects the presence or absence of a medium M on the hopper 26.

The medium detector 53 includes a tilting type lever 54 that can make contact with a medium M on the hopper 26 and a sensor cover 55 that accommodates a sensor (not illustrated) that detects a tilting of the lever 54 in contact with a medium M. In this example, when the medium detector 53 is in a detection mode of detecting a medium M, the recording apparatus 11 permits feeding of the medium M. When the medium detector 53 does not detect a medium M, the recording apparatus 11 does not permit a feed action. The lever 54 of the medium detector 53 has a horizontally-extended shaft at the tip of which detection is done by an optical sensor (not illustrated) whose wing is composed of a photo coupler. The optical sensor is covered by the sensor cover 55, which serves as a blindfold. The medium detector 53 is located in such a place as not to interfere when the hopper 26 is elevated.

As shown in FIG. 8, the feed roller 51 is a roller that is larger in diameter than the retard roller 52, and is a roller having a D-shaped cross-section taken along a surface orthogonal to an axis of rotation. The feed roller 51 has an arc face 51A whose perimeter takes on a value that is longer than a transport distance needed for a medium on the medium mounting section 21 to be transported to a transport roller pair 61. Therefore, rotation of the feed roller 51 causes a single medium M to be fed to reach a nip position of the transport roller pair 61. The retard roller 52 applies a force of friction to media M nipped between the retard roller 52 and the feed roller 51 and thereby separates the media M into every single medium M. The feed roller 51 is rotary-driven by a feed motor (not illustrated) serving as a power source.

The hopper 26 is configured such that an end thereof located downstream in the feed direction can be displaced heightwise along the Z axis. The hopper 26 is driven in tandem with rotation of the feed roller 51. When the feed roller 51 starts rotating from a standby position shown in FIG. 8, the hopper 26 is elevated to bring a medium M into contact with the arc face 51A of the feed roller 51, whereby the medium M is fed by the feed roller 51. In the process of being fed while being nipped between the feed roller 51 and the retard roller 52, the medium M is separated from the following medium M, so that only the uppermost single medium M is fed. By the time, the feed roller 51 finishes a rotation by finishing feeding a medium M with the arc face 51A, the hopper 26 moves down from the feed position and returns to the retreat position.

As shown in FIG. 8, the transport mechanism 60 includes the transport roller pair 61 and an ejection roller pair 62 disposed downstream of the transport roller pair 61 in the transport direction Y1. Further, the transport mechanism 60 includes a fulcrum 63 that supports a medium M being transported. The fulcrum 63 is composed of an elongated plate member extending along a path of movement of the recording head 71, which moves along the X axis. The fulcrum 63 supports, between the transport roller pair 61 and the ejection roller pair 62 on a transport path, a portion of a medium M onto which liquid is ejected by the recording head 71. The recording head 71 records an image and/or a character on the medium M by ejecting liquid onto the portion of the medium M supported by the fulcrum 63.

The ejection opening 64, which is exposed by opening the lid 18, is located in the front of the housing 12. Further, the ejection tray 65 is stowed in a lower part of the housing 12 located below the feed mechanism 50 and the transport mechanism 60. A medium M subjected to recording by the recording section 70 are ejected from the ejection opening 64 and then loaded onto the ejection tray 65, which has been slid in advance outward.

The recording section 70 shown in FIG. 8 is for example of a serial-recording type and includes a carriage 72 mounted with the recording head 71. The carriage 72 is supported so as to be able to be moved along the X axis by a movement mechanism 73. The recording head 71 is placed opposite the fulcrum 63. The movement mechanism 73 includes a pair of upper and lower rail members 74 disposed in the housing 12, a carriage motor (not illustrated) serving as a drive source for the carriage 72 to be guided along the pair of rail members 74, and a power transmission mechanism 75 that transmits the power of the carriage motor to the carriage 72. The power transmission mechanism 75 is for example a belt power transmission mechanism including a pair of pulleys and a timing belt stretched over the pair of pulleys. Forward reverse driving of the carriage motor causes the carriage 72 to reciprocate along the X axis. The recording apparatus 11 performs recording on a medium M during a recording action by alternately performing a recording action by which the recording head 71 performs recording while the carriage 72 is moving once along the X axis and a transport action by which the transport mechanism 60 transports the medium M to the next recording position with the two roller pairs 61 and 62 driven. Then, after the end of the recording on the medium M, the roller pairs 61 and 62 are driven to eject the medium M through the ejection opening 64.

As shown in FIG. 8, the carriage 72 of this example has mounted on an upper part thereof an ink accommodating section 76 that accommodates liquid, such as ink, that is supplied to the recording head 71. This example is of an on-carriage type in which a user refills the ink accommodating section 76 mounted on the carriage 72 with ink from an ink bottle. Alternatively, an off-carriage type may be employed in which the ink accommodating section 76, such as an ink cartridge or an ink tank, that accommodates liquid, such as ink, that is supplied to the recording head 71 is fitted to a fitting section located separately from the carriage 72 and the liquid is supplied to the recording head 71 through a tube.

Further, as shown in FIG. 8, the reading unit 30 is provided on top of the housing 12 and includes the document feed opening 32, the transport section 33, which transports a document D taken in from the document feed opening 32, and the reading section 34, which reads a document D being transported. The transport section 33 includes a feed roller 38 and an ejection roller 39. The reading section 34 is located between the two rollers 38 and 39 and reads a document D (see FIG. 3) that is transported by the two rollers 38 and 39. The document D thus read is ejected from the document ejection opening 35 and guided obliquely upward along the guide section 36.

As shown in FIG. 8, the ejection tray 65 is provided in a lower part of the interior of the housing 12. The ejection tray 65 is used in a state of having been drawn out by being slid from the stowage position shown in FIG. 1 in a state where a user has opened the lid 18. Opening the lid 18 provided in the front of the housing 12 exposes the ejection opening 64, through which a medium M subjected to recording is ejected, and the ejection tray 65, onto which a medium M subjected to recording and ejected from the ejection opening 64 is loaded. The lid 18, which is of an openable type, is provided in a lower part of the front of the housing 12, and when stowed in the housing 12, the ejection tray 65 is covered by the lid 18 being closed.

The feed mechanism 50 is not limited to a system of feeding a medium M mounted on the mounting tray 14 but may also include a cassette feed system including a cassette that is detachably stowed in a lower part of the housing 12 and a pickup roller that sends out the uppermost one of mediums M accommodated in the cassette. Further, a roll type feed mechanism may also be provided which includes a fitting section, provided in the rear of the housing 12, to which a roll of paper can be rotatably fitted and which feeds a medium M by unreeling the roll of paper. In this case, the recording apparatus 11 may include a cutter mechanism, located in a place in the hosing 12 near the ejection opening 64, that cuts an elongated medium M subjected to recording into a predetermined size.

As shown in FIG. 8, the recording apparatus 11 includes a control section 100. The control section 100 exercises various types of control including recording control on the recording apparatus 11. To the control section 100, the medium detector 53, a linear encoder, and other components are electrically coupled as an input system. The control section 100 controls the feed motor, a transport motor, the carriage motor, and the recording head 71.

The recording apparatus 11 is communicably connected to a host apparatus (not illustrated). The control section 100 accepts a recording start command by receiving recording data from the host apparatus. Further, when the medium detector 53 does not detect a medium M, the control section 100 does accept a recording start command but does not drive the feed motor, which serves as a power source for the feed mechanism 50. When the medium detector 53 detects a medium M, the control section 100 drives the feed motor, which serves as a power source for the feed mechanism 50. The control section 100 drives the feed motor so that the feed mechanism 50 feeds a medium M mounted on the mounting tray 14. Then, the transport mechanism 60 transports the medium M to a recording start position on the basis of driving of the transport motor. A recording action by which ink drops are ejected from the recording head 71 during movement of the carriage 72 moving on the basis of driving of the carriage motor and a transport action by which the transport mechanism 60 transports the medium M to the next recording position on the basis of driving of the transport motor are alternately repeated, whereby an image based on the recording data is recorded on the medium M.

Figure 9:
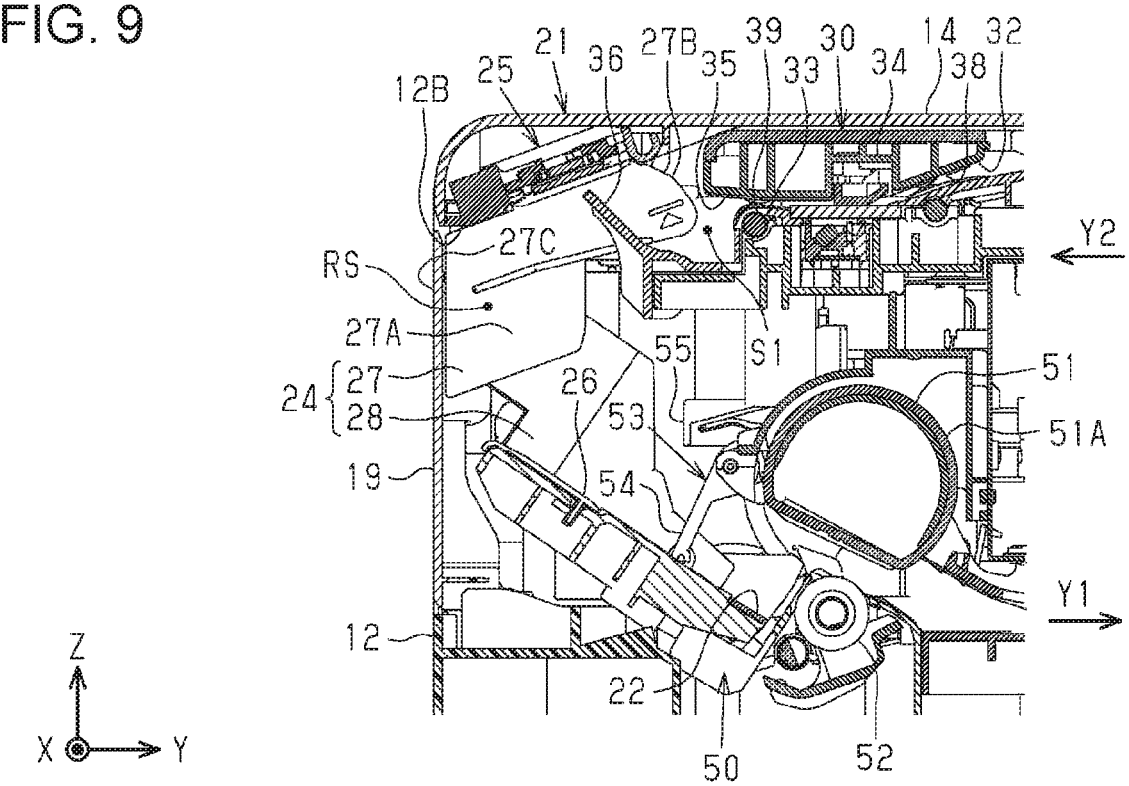
FIG. 9 is a sectional side view of the main components of the recording apparatus with its mounting tray in a closed position.

As shown in FIG. 9, the guide section 36, which guides the direction of ejection of a document D that is ejected from the reading unit 30, is provided. In a state where the mounting tray 14 is in the closed position, parts of the first edge guides 27 are disposed in a document ejection space S1, which is a space into which a document D is ejected from the document ejection opening 35 of the reading unit 30. In particular, the extension sections 27B of the first edge guides 27 are disposed in the document ejection space S1. In this document ejection space S1, the guide section 36, which guides the direction of ejection of a document D that is ejected, is located. The guide section 36 is located in a central part between ranges of movement of the pair of edge guides 24 widthwise. When the mounting tray 14 is in the closed position, the pair of first edge guides 27 make no contact with the guide section 36 no matter where the edge guides 24 are located widthwise. When the mounting tray 14 is in the closed position, the first edge guides 27 are stowed in places in the housing 12 that are different from the place in which the guide section 36 is located (see FIG. 6) and, as shown in FIG. 9, overlap the guide section 36 widthwise.

Furthermore, as shown in FIG. 9, the mounting tray 14, when in the closed position, is disposed in a state of covering the document feed opening 32 of the reading unit 30. Further, when the mounting tray 14 is in the closed position, backward-facing end faces 27C of the first edge guides 27, which are in stowage postures, face an inner surface of a plate section 19A of the back cover 19, which is in the closed position. In particular, when the back cover 19 is in the closed position, the end faces 27C of the first edge guides 27 make contact with an inner surface of the back cover 19 or face the inner surface at a distance from the inner surface. Further, as shown in FIG. 9, when the mounting tray 14 is in the closed position, the mounting tray 14 and the back cover 19 overlap each other heightwise. In the present embodiment, the first edge guides 27 constitute an example of the edge guide member.

Further, as shown in FIG. 9, when the mounting tray 14 is in the closed position, the first edge guides 27 overlap parts of the feed mechanism 50 in position of the transport direction Y1. That is, in a state where the mounting tray 14 is in the closed position, the first edge guides 27 overlap parts of the feed mechanism 50 heightwise along the Z axis. In particular, when the mounting tray 14 is in the closed position, the first edge guides 27 overlap parts of the hopper 26 and medium detector 53 of the feed mechanism 50 heightwise. The first edge guides 27 overlap parts of the lever 54 and sensor cover 55 of the medium detector 53. For this reason, the housing 12 is shorter in dimension in the direction of depth thereof than in a configuration in which the first edge guides 27 and the feed mechanism 50 do not partially overlap each other heightwise.

Figure 10:
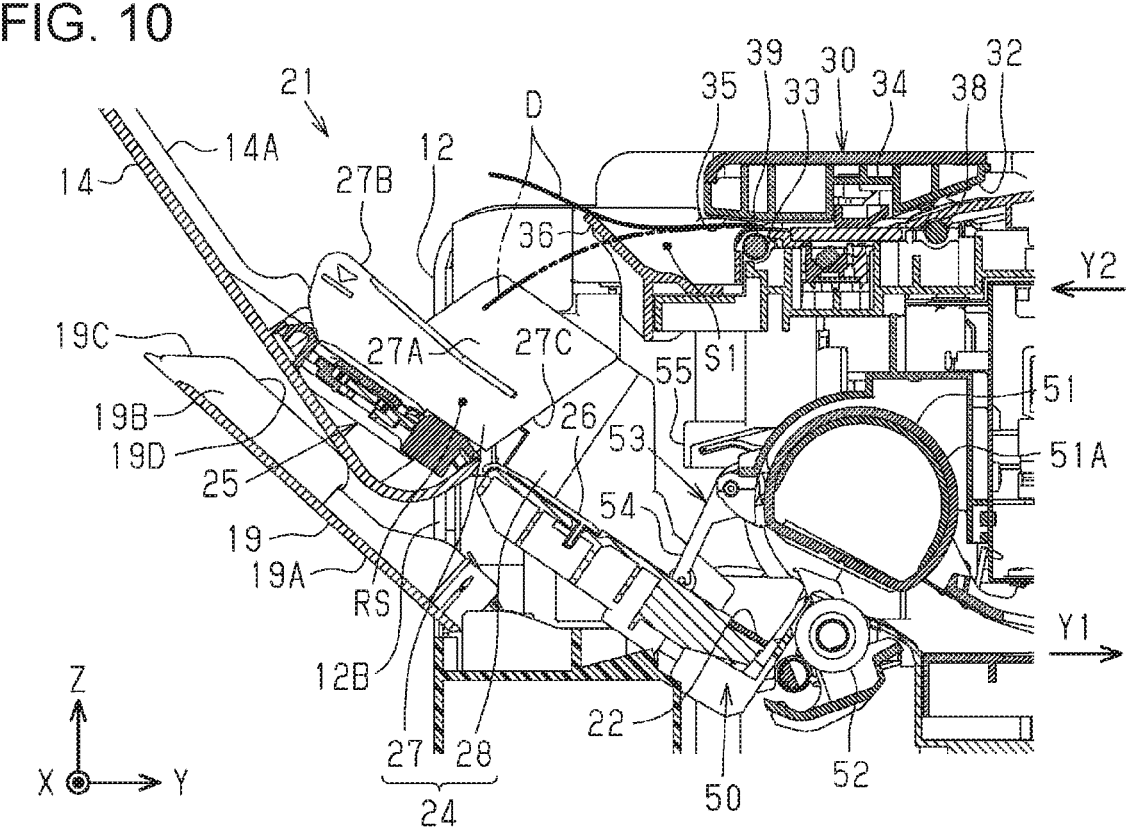
FIG. 10 is a sectional side view of the main components of the recording apparatus with its mounting tray in the open position.

Further, as shown in FIG. 10, when the mounting tray 14 is in the open position, the extension sections 27B of the first edge guides 27 extend upward from the feed opening 22. In FIG. 9, the extension sections 27B are extended as long as possible to such an extent as to be able to be stowed in the document ejection space S1. For this reason, when the mounting tray 14 is in the open position, the extension sections 27B of the first edge guides 27 extend long upward from the feed opening 22. This allows a user to easily operate the edge guides 24 by holding the extension sections 27B of the first edge guides 27.

As shown in FIG. 10, the mounting tray 14, which is in the open position, is located in a place to which a document D is ejected in the direction of ejection from the document ejection opening 35 of the reading unit 30. That is, parts of the first edge guides 27 are located on extensions of the horizontal direction of ejection of a document D that is ejected substantially horizontally from the document ejection opening 35. As shown in FIG. 10, the guide section 36 guides upward the direction of ejection of a document D that is ejected from the document ejection opening 35 of the reading unit 30. That is, a document D ejected from the document ejection opening 35 of the reading unit 30 is guided by the guide section 36 to be ejected obliquely upward. In a configuration without the guide section 36, the leading end of a document D that is ejected from the document ejection opening 35 hangs down under its own weight as indicated by a chain double-dashed line in FIG. 10 and touches the edge guides 24, with the result that there is a widthwise displacement in direction of ejection of the document D. Further, when the leading end of a document D ejected from the document ejection opening 35 is curved downwardly, the document D might enter the feed opening 22. On the other hand, in the present embodiment, the obliquely upward guidance by the guide section 36 of a document D ejected from the document ejection opening 35 prevents the document D from being displaced widthwise by touching the edge guides 24 and, in a case where the document D has a downwardly-curved leading end, prevents the document D from entering the feed opening 22.

Figure 11:
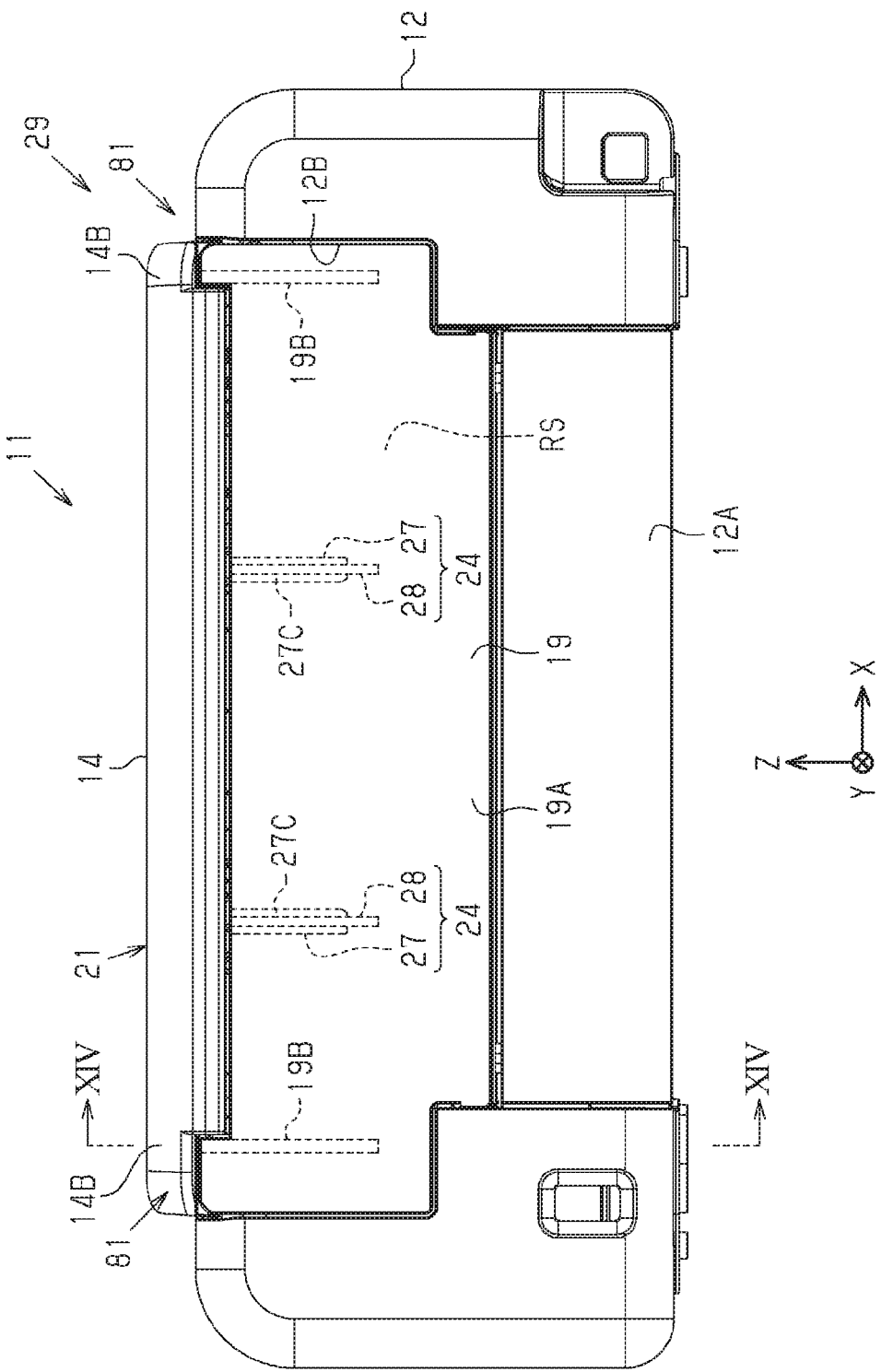
FIG. 11 is a back view of the recording apparatus.

As shown in FIGS. 10 and 11, the back cover 19 has a pair of cam followers 19B provided on the inner surface thereof so as to project from both widthwise ends of the plate section 19A. Each of the cam followers 19B has a first cam follower face 19C located in a place corresponding to a rotation leading end of the back cover 19 and composed of an oblique surface extending at a tilt with respect to the surface of the plate section 19A and a second cam follower face 19D located closer to a base end of the back cover 19 than the first cam follower face 19C and composed of a straight surface extending substantially parallel to the plate section 19A of the back cover 19.

As shown in FIGS. 8 to 11, the housing 12 has provided in the rear thereof a notched opening 12B that allows the mounting tray 14 to be disposed in an open-position posture. As shown in FIG. 8, the opening 12B is notched across a range equal to or more than a half of the height of the housing 12 downward from the upper surface of the housing 12. The opening 12B has a width which is wider than that of a corresponding portion of the mounting tray 14, e.g. the base end section of the mounting tray 14 (see FIG. 12). The opening 12B is notched to a lower position than an upper end of the hopper 26, and in a state where the mounting tray 14 has been rotated to the open position, the hopper 26 and the mounting tray 14 are coupled to each other at a height position lower than the upper surface of the housing 12 by a predetermined distance. In the example shown in FIG. 8, this predetermined distance is approximately ⅓ of the height of the housing 12.

As shown in FIG. 10, the mounting tray 14, which is in an opening position, is disposed in a state of entering the opening 12B, whereby the housing 12 has its rear face located relatively at the front. For example, in a configuration in which the housing 12 has no opening 12B in the rear face thereof, the housing 12 needs to be extended backward into such a size that a portion of the mounting tray 14, which is in the open position, located below the upper surface of the housing 12 can be accommodated in the housing 12. In this example, the housing 12 has its rear face shifted relatively forward by disposing the mounting tray 14, which is in the open position, in the opening 12B bored through the rear face of the housing 12. This keeps the housing 12 short in dimension in the transport direction Y1.

In the present embodiment, as shown in FIG. 10, in a state where the mounting tray 14 is in the open position, the feed opening 22 is opened toward the outside of the housing 12 in a range above the hopper 26 and the mounting tray 14 and below the guide section 36. Further, as shown in FIG. 10, the opening 12B is a portion in which the mounting tray 14 is disposed when the mounting tray 14 is in the open position and, as shown in FIG. 9, is covered by the back cover 19 in a state where the mounting tray 14 is in the closed position and out of the opening 12B. That is, when the mounting tray 14 is in the closed position, the feed opening 22 is closed and the opening 12B is covered by the back cover 19. Further, when the mounting tray 14 is in the open position, backward retreat of the back cover 19 makes the opening 12B open and the mounting tray 14 is disposed in the opening 12B, whereby the feed opening 22 becomes exposed.

Further, as shown in FIGS. 9 to 11, when the mounting tray 14 is closed, the back cover 19 closes into a state of covering the opening 12B in an interlocked fashion, and when the mounting tray 14 is open, the back cover 19 opens backward in an interlocked fashion and permits the movement of the mounting tray 14 to the opening 12B. As shown in FIG. 11, in a state where the mounting tray 14 is closed and the back cover 19 is closed, the first edge guides 27 have the end faces 27C, which face the inner surface of the back cover 19 and which the back cover 19 touches when pressed in a direction from an outer surface to the inner surface. That is, when the mounting tray 14 is closed, the end faces 27C of the first edge guides 27 are located in contact with or close to the back cover 19. For this reason, even when a user presses the plate section 19A of the back cover 19, the back cover 19 hardly bends, as the back cover 19 touches the end faces 27C of the first guide edges 27.

Figure 12:
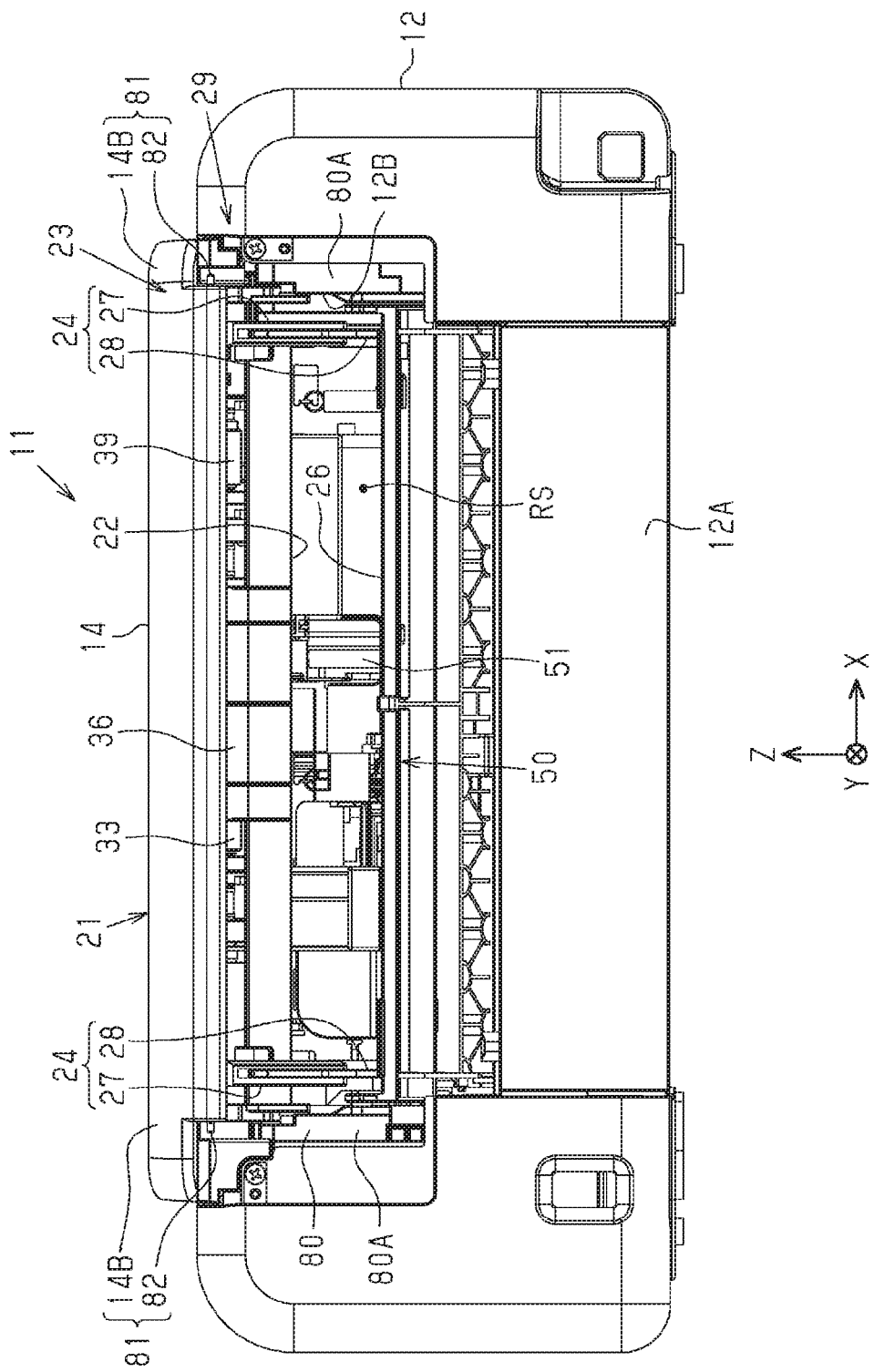
FIG. 12 is a back view of the recording apparatus with its back cover removed therefrom.
Figure 13:
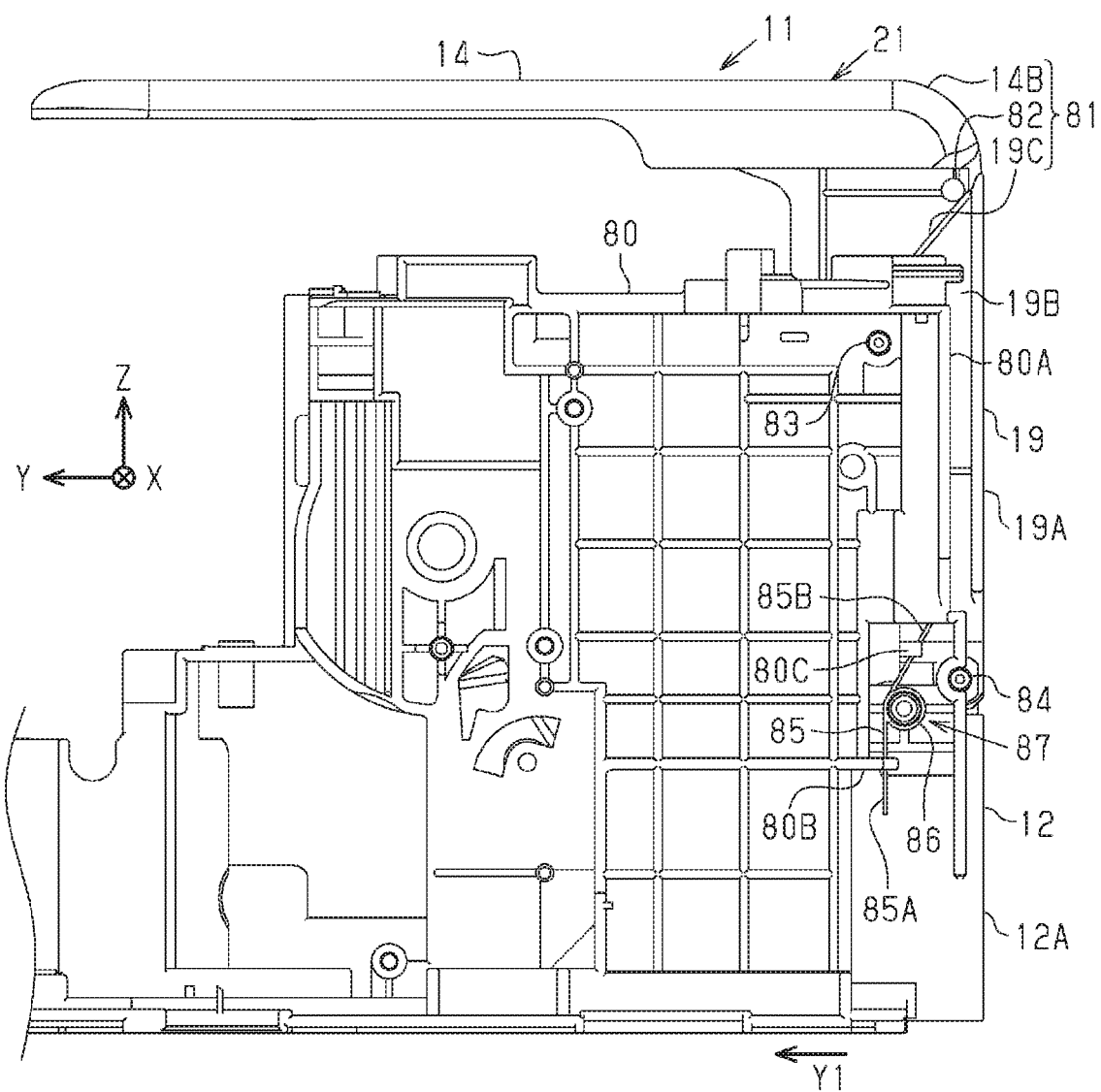
FIG. 13 is a side view showing the rear of the recording apparatus with its housing removed therefrom.
Figure 14:
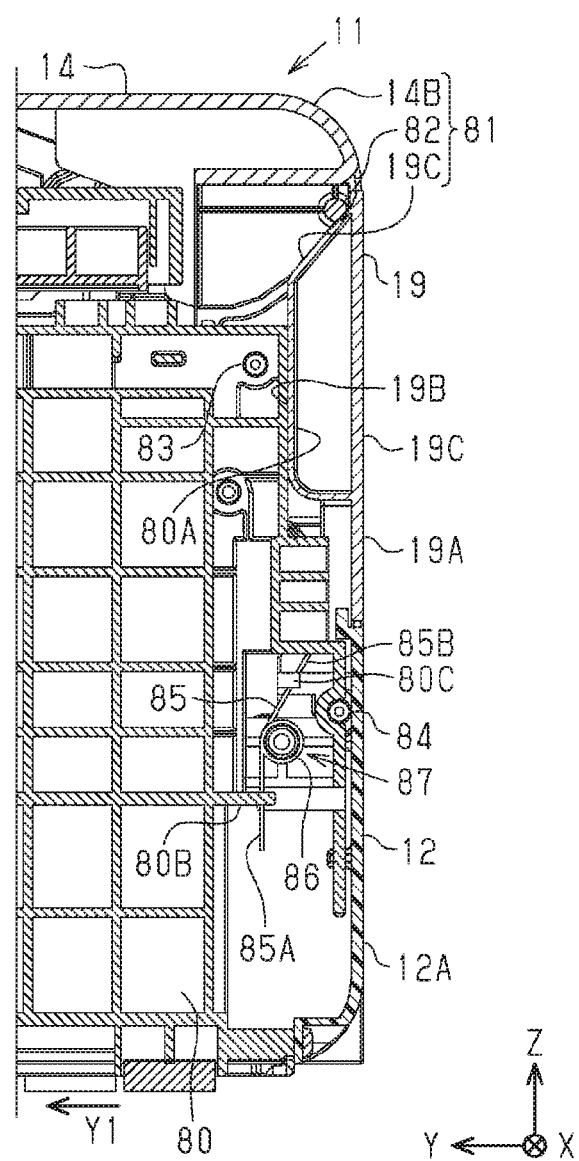
FIG. 14 is a partially cross-sectional view showing the recording apparatus as taken along line XIV-XIV in FIG. 11.

As shown in FIG. 12, the recording apparatus 11 includes an interlocking mechanism 29 that causes the back cover 19 to open and close in tandem with an operation of opening and closing the mounting tray 14. As shown in FIGS. 12 to 14, the interlocking mechanism 29 includes a cam mechanism 81 interposed between the mounting tray 14 and the back cover 19 and a biasing mechanism 87 (see FIG. 13) that biases the back cover 19 in a closing direction. In a process by which the mounting tray 14 rotates from the closed position to the opening position, the cam mechanism 81 rotates the back cover 19 in an opening direction against a biasing force of the biasing mechanism 87. A configuration of the cam mechanism 81 will be described in detail later.

As shown in FIG. 12, a base frame 80 is provided in the housing 12 as an example of a frame that rotatably supports the mounting tray 14 and the back cover 19. That is, the mounting tray 14 is rotatably supported by the base frame 80 accommodated in the housing 12. Further, the back cover 19 is rotatably supported by the base frame 80. The base frame 80 has a regulating surface 80A that the mounting tray 14 touches when the mounting tray 14 is in the open position and that the back cover 19 touches when the cover 19 is in the closed position. In this example, the base frame 80 has a pair of the regulating surfaces 80A located in such places that the pair of cam followers 19B provided on the inner surface of the back cover 19 so as to project from both widthwise ends can engage with the pair of regulating surfaces 80A.

Figure 17:
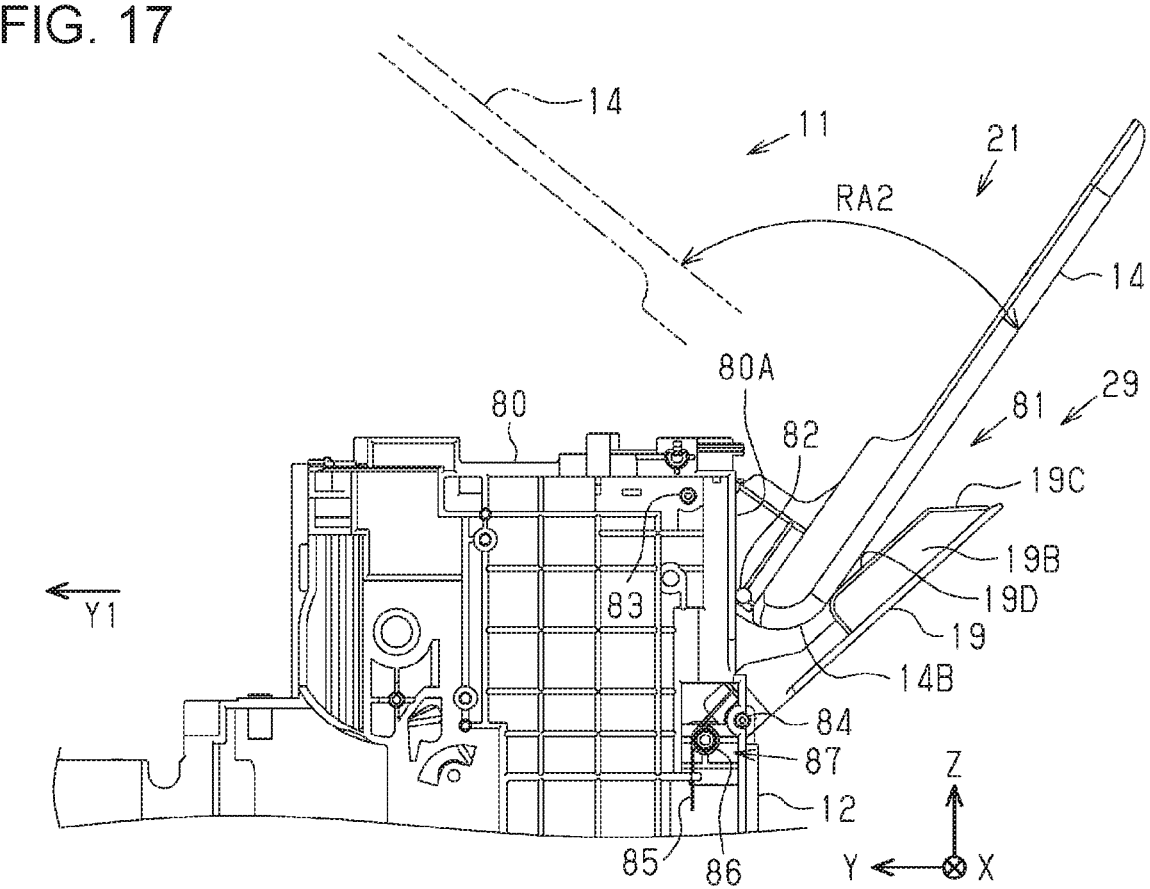
FIG. 17 is a side view showing the rear of the interior of the recording apparatus with its mounting tray in a second range of rotation.

As shown in FIGS. 13 and 14, each of the regulating surfaces 80A is a stepped surface having a widthwise arrangement of two surfaces differing in depth from each other forward. A limit position of the back cover 19 in a closing direction is defined by the second cam follower faces 19D of the pair of cam followers 19B touching the regulating surfaces 80A. Further, as shown in FIG. 17, a limit position of the mounting tray 14 in an opening direction is defined by a cam shaft 82 of the mounting tray 14 touching the regulating surfaces 80A. Alternatively, each of the regulating surfaces 80A may be a single flat surface instead of being a stepped surface.

As shown in FIG. 13, when in the closed position, the mounting tray 14 has its back end face flush with an outer surface of the back cover 19, which is in the closed position. As shown in FIGS. 13 and 14, the base frame 80 is provided with a rotating shaft 83 that rotatably supports the mounting tray 14. The rotating shaft 83 of the mounting tray 14 is located downstream of the back cover 19 in the transport direction Y1 of a medium M. The rotating shaft 83 is set in position so that when the mounting tray 14 has been rotated from the closed position to the open position, the face of the mounting surface 14A located between the two first edge guides 27 is coupled straight to the hopper 26 as shown in FIG. 10. Therefore, as shown in FIGS. 13 and 14, the rotating shaft 83 is located below and in front of a rear-end portion of the mounting tray 14 when the mounting tray 14 is in the closed position. Further, as shown in FIGS. 13 and 14, the base frame 80 is provided with a rotating shaft 84 that rotatably supports the back cover 19. The back cover 19 rotates on the rotating shaft 84 located at a base end section thereof. The rotating shaft 83 of the mounting tray 14 is located downstream of the rotating shaft 84 of the back cover 19 in the transport direction Y1.

As shown in FIG. 13, the biasing mechanism 87 includes a twisted spring 85 that biases the back cover 19 in a closing direction. The twisted spring 85 is supported by a spindle 86 located downstream of the rotating shaft 84 of the back cover 19 in the transport direction Y1, in which the feed mechanism 50 transports a medium M toward the recording section 70. The twisted spring 85, which is supported by the spindle 86, has a first end 85A latched on a latching section 80B and a second end 85B latched on a latching section 80C. When the back cover 19 rotates from the closed position to the open position, the second end 85B deforms against its own elastic force, whereby the twisted spring 85 biases the back cover 19 in a closing direction.

As shown in FIGS. 13 and 15 to 17, the recording apparatus 11 includes the cam mechanism 81, which rotates the back cover 19 in an interlocked fashion in response to rotation of the mounting tray 14. The cam mechanism 81 includes a cam 82 (which is an example of the first cam) and a cam face 14B (which is an example of the second cam) of the mounting tray 14 and the cam followers 19B of the back cover 19. The cam face 14B is composed of an outer circumferential surface of the base end section of the mounting tray 14 located lateral to a mounting region in which a medium M of the maximum width is mounted. The mounting tray 14 is provided with a pair of the cam shafts 82 and a pair of the cam faces 14B at both widthwise ends thereof. The cam followers 19B project from the inner surface of the back cover 19 in such places as to be able to engage with the cam shafts 82 and the cam faces 14B. In this example, the pair of cam followers 19B are provided on the inner surface of the back cover 19 so as to project from both widthwise ends. When causing the mounting tray 14 to rotate between the closed position and the open position, the cam shafts 82 and the cam faces 14B engage with the cam followers 19B.

Figure 15:
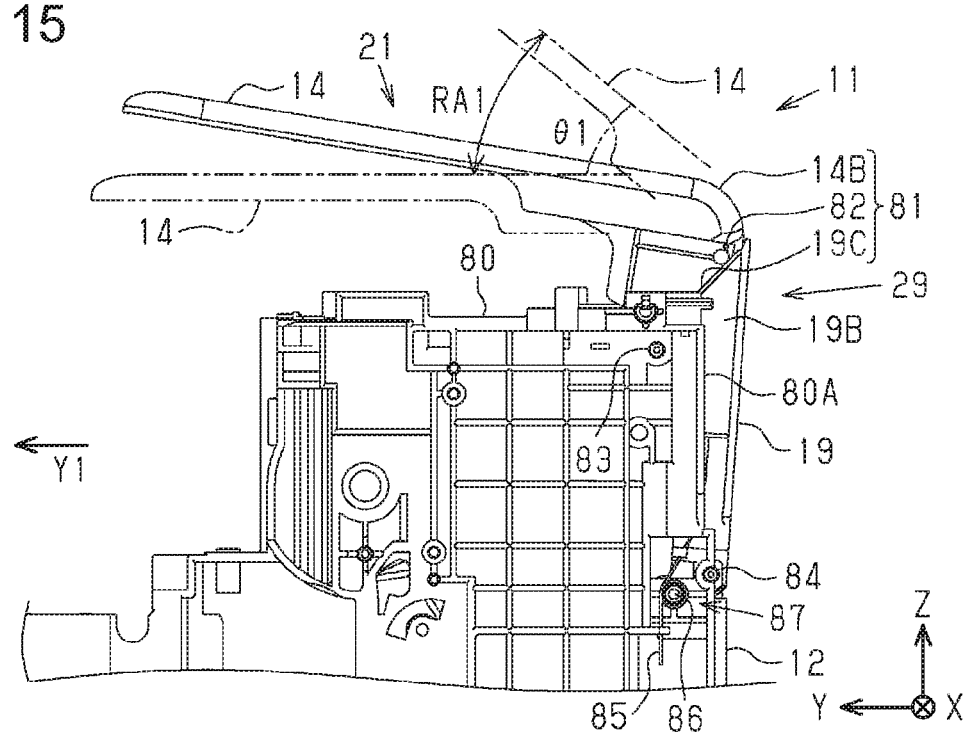
FIG. 15 is a side view showing the rear of the interior of the recording apparatus with its mounting tray in a first range of rotation.

The mounting tray 14 has a first range of rotation RA1 within which the engagement of the cam shafts 82 with the cam followers 19B causes the back cover 19 to rotate from the closed position to a predetermined opening angle and a second range of rotation RA2 within which the engagement of the cam faces 14B with the cam followers 19B causes the back cover 19 to rotate between a position at the predetermined opening angle and the open position. In particular, as shown in FIG. 15, the first range of rotation RA1 is a range of rotation within which the mounting tray 14 rotates between the closed position or an engagement start position where the mounting tray 14 is slightly more open than in the closed position and a position at a predetermined opening angle θ1. In the first range of rotation RA1, the cam shafts 82 engage with the first cam follower faces 19C of the back cover 19 and thereby cause the back cover 19 to rotate between the closed position and a position at a predetermined opening angle θ2 (see FIG. 16). Further, as shown in FIG. 17, the second range of rotation RA2 is a range of rotation within which the mounting tray 14 rotates between the position at the predetermined opening angle θ1 (i.e. a position indicated by a chain double-dashed line in FIG. 17) and the open position. In the second range of rotation RA2, the cam faces 14B engage with the first cam follower faces 19C and second cam follower faces 19D, in sequence, of the back cover 19 and thereby cause the back cover 19 to rotate between the at the predetermined opening angle θ2 (see FIG. 16) and the open position. The mounting tray 14 causes the back cover 19 to rotate in two stages in which the cam shafts 82 and the cam faces 14B engage with the cam followers 19B in sequence, respectively.

FIG. 15 shows a state where the mounting tray 14 is open at a predetermined angle (e.g. 10 degrees) within the first range of rotation RA1. Note here that the mounting tray 14 is at an angle of 0 degree when it is in the closed position, in which it takes a horizontal posture, and the opening angle becomes gradually larger as the mounting tray 14 rotates in an opening direction from the angle of 0 degree. The first range of rotation RA1 extends from the closed position of the mounting tray 14 to a first opening angle θ1, and the second range of rotation RA2 extends from the first opening angle θ1 through a second opening angle to a third opening angle at which the mounting tray 14 is in the open position.

As shown in FIG. 15, in the first range of rotation RA1, the cam shafts 82 engage with the first cam follower faces 19C and press the first cam follower faces 19C, whereby the back cover 19 rotates in an opening direction from the closed position. The first cam follower faces 19C are composed of oblique surfaces inclined with respect to a back surface of the back cover 19 (i.e. the surface of the plate section 19A) so as to be surfaces as orthogonal as possible to movement loci that the cam shafts 82 draw when the mounting tray 14 rotates on the rotating shaft 83. For this reason, even when the cam followers 19B project from the inner surface of the back cover 19, the cam shafts 82 press the first cam follower faces 19C in a substantially orthogonal direction, making it possible to transmit a force to the back cover 19 so that the back cover 19 can open from the closed position.

Figure 16:
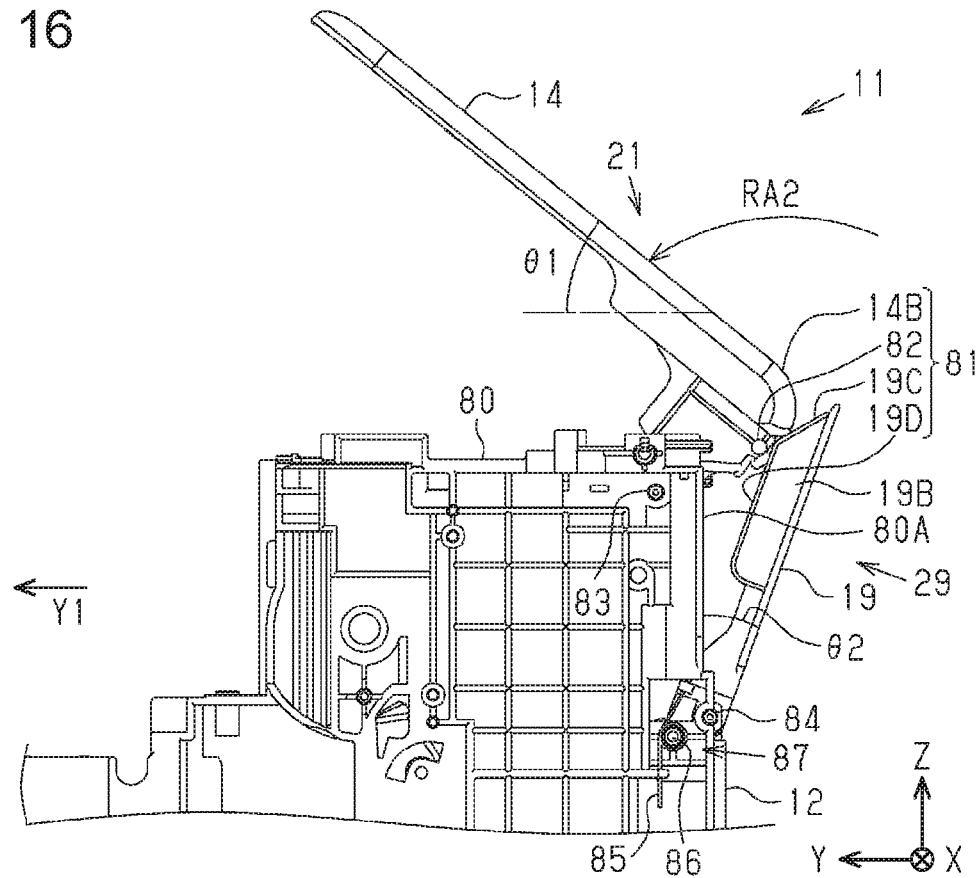
FIG. 16 is a side vide showing the rear of the interior of the recording apparatus with its mounting tray at a predetermined opening angle.

FIG. 16 shows a state where the mounting tray 14 is at the first opening angle θ1. When the mounting tray 14 reaches the first opening angle θ1, the cam followers 19B change from engaging with the cam shafts 82 to engaging with the cam faces 14B. In this example, the first opening angle θ1 is set at a predetermined angle falling within a range of, for example, 20 degrees to 60 degrees. FIG. 16 shows an example in which the first opening angle θ1 is approximately 40 degrees. The first opening angle θ1 may be set at any value within a range of rotation between the closed position and the open position.

FIG. 17 shows a state where the mounting tray 14 is in the open position. In this example, the opening angle at which the mounting tray 14 is in the open position takes on a predetermined value falling within a range of, for example, 100 degrees to 160 degrees. FIG. 17 shows an example in which the opening angle in the open position is approximately 125 degrees. It should be noted that the opening angle at which the mounting tray 14 is in the open position may be an angle at which a medium M can be mounted on the mounting tray 14 and a medium M does not slip off under its own weight from the mounting tray 14 to the hopper 26.

The second range of rotation RA2 is a range within which the mounting tray 14 rotates between the first opening angle θ1 shown in FIG. 16 and the third opening angle at which the mounting tray 14 is in the open position shown in FIG. 17. The second range of rotation RA2 includes a range of rotation (see FIG. 16) within which the back cover 19 is rotated by the cam faces 14B engaging with the first cam follower faces 19C and pressing the first cam follower faces 19C and a range of rotation (see FIG. 17) within which the back cover 19 is rotated by the cam faces 14B engaging with the second cam follower faces 19D and pressing the second cam follower faces 19D. When the mounting tray 14 reaches the second opening angle with the second range of rotation RA2, the cam faces 14B change from engaging with the first cam follower faces 19C to engaging with the second cam follower faces 19D.

Next, the workings of the recording apparatus 11 are described.

When the recording apparatus 11 is not in use, the mounting tray 14 is closed as shown in FIGS. 1 and 2. At this point in time, the feed opening 22 of the recording unit 20 and the document feed opening 32 and document ejection opening 35 of the recording unit 30 are covered by the mounting tray 14. This makes it hard for dust to enter the feed opening 22, the document feed opening 32, or the document ejection opening 35. Further, since the mounting tray 14 is stowed in a horizontal posture over the upper surface of the housing 12, the mounting tray 14 causes no obstruction. For this reason, when not in use, the recording apparatus 11 can be compactly stowed. Since the ejection opening 64 of the recording unit 20 is covered by the lid 18 being closed, entry of dust from the ejection opening 64 is reduced.

In using the recording apparatus 11, a user rotates the mounting tray 14 from the closed position to the open position. In tandem with this rotation of the mounting tray 14, the back cover 19 rotates from the closed position to the open position. The retreat of the back cover 19 to the open position causes the mounting tray 14 to rotate to the open position while its base end section is moving down through the opening 12B notched in the back surface of the housing 12. As a result, the mounting tray 14 is disposed in the open position, in which it is tilted backward at the predetermined angle shown in FIGS. 3 and 4. In this open position, the base end section of the mounting tray 14 is disposed in the rear space RS in the housing 12 in such a state as to be stowed in the opening 12B.

At this point in time, the back cover 19 opens in an interlocked manner via the cam mechanism 81 in response to the operation of rotating the mounting tray 14. As shown in FIG. 15, in the first range of rotation RA1, within which the mounting tray 14 is rotated from the closed position or the engagement start position to the position at the predetermined opening angle θ1, the engagement of the cam shafts 82 with the first cam follower faces 19C causes the back cover 19 to rotate from the closed position to the position at the predetermined opening angle θ2. Further, as shown in FIGS. 16 and 17, in the second range of rotation RA2, within which the mounting tray 14 is rotated from the position at the predetermined opening angle θ1 to the open position, the sequential engagement of the cam faces 14B with the first cam follower faces 19C and the second cam follower faces 19D causes the back cover 19 to rotate from the position at the predetermined opening angle θ2 to the open position. At the time of such an operation of rotating the mounting tray 14 in an opening direction, the back cover 19 rotates in an opening direction in two stages in which the cam shafts 82 and the cam faces 14B engage with the cam followers 19B in sequence, respectively.

For this reason, even when the cam followers 19B, which project from the inner surface of the back cover 19, are located below the mounting tray 14, the back cover 19 can be rotated in an opening direction by causing the cam shafts 82 and the cam faces 14B to engage with the cam follower 19B in sequence. This makes it unnecessary to dispose the back cover 19 at the back in a state where the cam followers 19B are located behind the mounting tray 14 when the mounting tray 14 is in the closed position, contributing to a reduction in size of the recording apparatus 11 in the transport direction Y1.

Further, this operation of rotating the mounting tray 14 in an opening direction causes the first edge guides 27 to rotate from an angle relative to the second edge guides 28, shown in FIG. 9, at which the first edge guides 27 are stowed in the bent state, whereby the first edge guides 27 are disposed at an angle relative to the second edge guides 28, shown in FIG. 10, at which the first edge guides 27 are extended straight for use. The first edge guides 27 have the extension sections 27B, which are extended as long as possible to such an extent as to be able to be stowed in the document ejection space S1 under the state of stowage shown in FIG. 9. For this reason, as shown in FIGS. 8 and 10, in a state where the mounting tray 14 is open, the extension sections 27B of the first edge guides 27 extend long obliquely upward from the feed opening 22. After having mounted a medium M on the mounting tray 14, a user operates the edge guides 24 by holding the extension sections 27B of the first edge guides 27 in order to effect widthwise positioning of the medium M.

When operated by a user, the first edge guides 27 are subjected to a resistance load by the load section 44. Since the load section 44 is provided in the same mounting tray 14 as the first edge guides 27, an operation of the first edge guides 27 by a user holding the first edge guides 27 does not lead to the occurrence of "wrenching", which will bring a shift of a load located in a place distant in a direction orthogonal to the direction of operation. That is, in the present embodiment, the distance between each of the first edge guides 27 and the load section 44 in the feed direction is shorter than in a configuration in which a load section is provided in the hopper 26. For this reason, operating the first edge guides 27 does not entail a wrenching operation.

In drawing out the ejection tray 65, a user opens the lid 18 located in the front of the housing 12. An operation by a user of a pointing device (not illustrated), such as a keyboard or a mouse, of the host apparatus (not illustrated) causes recording data to be transmitted from the host apparatus to the recording apparatus 11.

The control section 100 drives the feed motor and the transport motor on the basis of received recording data so that a medium M mounted on the mounting tray 14 is transported to the recording start position. At this point in time, the hopper 26 tilts from the retreat position to the feed position and the feed roller 51 rotates, whereby the uppermost medium M on the hopper 26 is fed in a state of being pinched between the feed roller 51 and the retard roller 52. Next, a recording action during which the recording head 71 performs a single passage of recording on the medium M in the process of movement by which the carriage 72 moves once and a transport action by which the transport roller pair 61 and the ejection roller pair 62 transport the medium M to the next recording position are alternately performed, whereby an image is recorded on the medium M. After the end of the recording on the medium M, the medium M is ejected through the ejection opening 64 by the transport roller pair 61 and the ejection roller pair 62 and mounted onto the ejection tray 65.

Even when a medium M is subjected to a widthwise force at the time of feeding of the medium M and the time of transportation of the medium M during recording, misregistration of the pair of edge guides 24 can be avoided, as a load based on the load section 44 is applied to the pair of edge guides 24. For this reason, over a period from the start of recording to the end of recording, the medium M is retained in a position determined widthwise by the pair of edge guides 24. This makes it possible to prevent misaligned recording attributed to widthwise misregistration of the medium M during recording.

Further, in scanning or copying a document D through the use of the reading unit 30 of the recording apparatus 11, a user rotates the mounting tray 14 from the closed position to the open position. The user mounts the document D onto the document mounting section 31 and effects widthwise positioning of the document D through the use of the edge guide 37. The user performs an operation of giving an instruction to scan or copy. Upon accepting the instruction to scan or copy, the control section 100 drives the reading unit 30. That is, the control section 100 drives the transport section 33 to transport the document D and reads the document D being transported with the reading section 34.

The document D thus read is ejected from the document ejection opening 35. The mounting tray 14, which has been disposed in a backward tilting posture, is located in a place to which the document is ejected in the direction of ejection from the document ejection opening 35 of the reading unit 30. The first edge guides 27 have their upper ends located slightly below an extension of the horizontal direction of ejection of the document D, which is ejected substantially horizontally from the document ejection opening 35. The document D, which has been ejected from the document ejection opening 35 of the reading unit 30, is guided obliquely upward by the guide section 36. In a configuration without the guide section 36, the leading end of a document D that is ejected from the document ejection opening 35 hangs down under its own weight as indicated by a chain double-dashed line in FIG. 10 and touches the edge guides 24, with the result that there is a widthwise displacement in direction of ejection of the document D. Further, when the leading end of a document D ejected from the document ejection opening 35 is curved downwardly, the document D might enter the feed opening 22. However, in the present embodiment, the obliquely upward guidance by the guide section 36 of a document D ejected from the document ejection opening 35 prevents the document D from being undesirably displaced widthwise by touching the edge guides 24 and prevents the document D from undesirably entering the feed opening 22.

In a case where a user has given a scan instruction, the control section 100 transfers, to the host apparatus, reading data obtained by the reading section 34 reading a document D. Further, in a case where a user has given a copy instruction, the control section 100 causes the recording unit 20 to perform recording based on reading data obtained by the reading section 34 reading a document D. A medium M subjected to copy recording is ejected from the ejection opening 64 and loaded onto the ejection tray 65.

After finishing the use of the recording apparatus 11, the user stows the mounting tray 14 by rotating it from the open position shown in FIGS. 3 and 4 to the closed position shown in FIGS. 1 and 2. At this point in time, the back cover 19, which has been biased in a closing direction by the biasing mechanism 87, rotates from the open position to the closed position in tandem with the operation of rotating the mounting tray 14 in a closing direction, and closes into a state of covering the opening 12B. This prevents dust from entering the housing 12 through the opening 12B when the recording apparatus 11 is not in use.

As described above in detail, the first embodiment can bring about the following effects.

(1) A recording apparatus 11 includes a medium mounting section 21, a feed mechanism 50, a recording section 70, a housing 12, and a reading unit 30. The reading unit 30 is provided on top of the housing 12 and includes a document feed opening 32, a transport section 33, and a reading section 34 that reads a document D being transported. The medium mounting section 21 includes a mounting tray 14 configured to rotate between a closed position in which the mounting tray 14 covers a feed opening 22 and a closed position in which the mounting tray 14 is configured to have the medium M mounted thereon. The housing 12 includes an opening 12B, bored in one side surface (back surface) of the housing 12 located upstream in a transport direction Y1, in which the mounting tray 14 is stowed when the mounting tray 14 is in the open position. A back cover 19 moves in tandem with the mounting tray 14, and moves to a closed position in which the back cover 19 covers the opening 12B when the mounting tray 14 is closed and an open position in which the back cover 19 does not prevent the mounting tray 14 from rotating for stowage in the opening 12B when the mounting tray 14 is open. When in the closed position, the mounting tray 14 covers the document feed opening 32 of the reading unit 30.

Therefore, when the mounting tray 14 is opened, the back cover 19 opens in an interlocked fashion, and when the mounting tray 14 is closed, the back cover 19 closes in an interlocked fashion. When having rotated to the open position, the mounting tray 14 is disposed in a state of being stowed in the opening 12B of the housing 12. When the mounting tray 14 is in the closed position, the mounting tray 14 covers the feed opening 22 and the document feed opening 32 and the back cover 19 covers the opening 12B of the housing 12. For example, in a case where the opening 12B is not provided in the housing 12, the size of the housing 12 in the transport direction Y1 needs to be made larger so that a portion of the mounting tray 14 that is located on a lower level than an upper surface of the housing 12 when the mounting tray 14 is in the open position is stowed in the housing 12. On the other hand, in the present embodiment, a back surface of the housing 12 can be located relatively downstream in the transport direction Y1, as the mounting tray 14 is configured to be stowed in the opening 12B. Moreover, when the mounting tray 14 is in the closed position, in which the mounting tray 14 is out of the opening 12B, the back cover 19 covers the opening 12B, so that there is no concern for entry of dust through the opening 12B when the recording apparatus 11 is not in use. This makes it possible to reduce entry of dust into the housing 12 and, at the same time, reduce the size of the recording apparatus 11 in the transport direction Y1.

(2) A rotating shaft 83 of the mounting tray 14 is located downstream of a rotating shaft 84 of the back cover 19 in the transport direction Y1. Therefore, when the back cover 19 is closed, the rotating shaft 83 of the mounting tray 14 causes no obstruction. This makes it possible to locate the back cover 19 relatively close to downstream in the transport direction Y1. For example, despite the fact that the cam follower 19B is provided on the inner surface of the back cover 19 so as to project from both widthwise ends, the back cover 19 can be located close to downstream in the transport direction Y1. This makes it possible to reduce the size of the recording apparatus 11 in the transport direction Y1.

(3) When the mounting tray 14 is in the closed position, the mounting tray 14 and the back cover 19 overlap each other heightwise. Therefore, the back cover 19 closes into such a position as to partially overlap below the mounting tray 14 when the mounting tray 14 is in the closed position. This makes it possible to reduce the size of the recording apparatus 11 in the transport direction Y1.

(4) The mounting tray 14 includes a first edge guide 27 (which is an example of the edge guide member) configured to move across a width of the medium M, and when the back cover 19 is in the closed position, the first edge guide 27 has an end face 27C that makes contact with an inner surface of the back cover 19 or faces the inner surface at a distance from the inner surface. Therefore, when the mounting tray 14 is in the closed position, bending of the back cover 19 can be reduced even when a user presses an outer surface of the back cover 19 in a closed state, as the inner surface of the back cover 19 touches the end face 27C of the first edge guide 27. Therefore, a reduction in thickness of the back cover 19 is achieved by thinning or eliminating a rib that is provided to enhance the strength of the back cover 19. The reduction in thickness of the back cover 19 can lead to a reduction in size of the recording apparatus 11 in the transport direction Y1.

(5) The recording apparatus 11 further includes a cam mechanism 81 that causes the back cover 19 to rotate in tandem with rotation of the mounting tray 14. Therefore, the cam mechanism 81 allows the back cover 19 to rotate in tandem with rotation of the mounting tray 14.

(6) The recording apparatus 11 further includes a twisted spring 85 that biases the back cover 19 in a closing direction, and the cam mechanism 81 includes a cam (i.e. a cam shaft 82 and a cam face 14B) provided in the mounting tray 14 and a cam follower 19B provided in the back cover 19. The back cover 19 opens in an interlocked fashion by the cam pressing the cam follower 19B against a biasing force of the twisted spring 85 (which is an example of the biasing member) when the mounting tray 14 opens. Therefore, opening the mounting tray 14 causes the cam to press the cam follower 19B, whereby the back cover 19 opens in an interlocked fashion. Closing the mounting tray 14 causes the back cover 19 to close under a biasing force of the twisted spring 85. This makes it possible, with a simple configuration, to open and close the back cover 19 in tandem with the opening and closing of the mounting tray 14.

(7) The recording apparatus 11 further includes a rotating shaft 84 that rotatably supports the back cover 19. The biasing member is the twisted spring 85, which biases the back cover 19 in a closing direction. The twisted spring 85 is supported by a spindle 86 located downstream of the rotating shaft 84 of the back cover 19 in the transport direction Y1. This makes it possible to shorten the dimension of the housing 12 in the transport direction Y1 in which the back cover 19 can be entirely stowed in the housing 12 without the twisted spring 85 protruding in the direction that is behind the back cover 19. This makes it possible to reduce the size of the recording apparatus 11 in the transport direction Y1.

(8) The cam mechanism 81 includes the cam shaft 82 and cam face 14B of the mounting tray 14 and the cam follower 19B of the back cover 19. The mounting tray 14 opens the back cover 19 in two stages consisting of a first range of rotation RA1 within which the back cover 19 is rotated from the closed position to a predetermined opening angle by the cam shaft 82 engaging with the cam follower 19B and a second range of rotation RA2 within which the back cover 19 is rotated from the predetermined opening angle to the open position by the cam face 14B engaging with the cam follower 19B. Note here that a configuration in which the back cover 19 is rotated by a single cam section in tandem with rotation of the mounting tray 14 makes it necessary to keep a great distance from the rotating shaft 83 of the mounting tray 14 backward to the position of the cam section. On the other hand, a configuration in which the mounting tray 14 is rotated in two stages through the use of two types of cam (i.e. the cam shaft 82 and the cam face 14B) makes it possible to dispose two types of cam section in a place at a short distance from the rotating shaft 83 of the mounting tray 14 backward. This makes it possible to reduce the size of the recording apparatus 11 in the transport direction Y1 (i.e. the direction of depth) while ensuring a smooth rotation of the mounting tray 14.

(9) The cam face 14B is an outer circumferential surface of a base end section of the mounting tray 14 located lateral to a mounting region in which a medium of a maximum width is mounted. The cam follower 19B projects from an inner surface of the back cover 19 so as to be positioned to engage with the cam face 14B composed of the outer circumferential surface. This eliminates the need to provide a dedicated cam section, thus achieving a reduction in size of the recording apparatus 11 in the transport direction Y1 in addition to a simple configuration.

(10) The mounting tray 14 is rotatably supported by a base frame 80 accommodated in the housing 12. The back cover 19 is rotatably supported by the base frame 80. The base frame 80 has a regulating surface 80A that the mounting tray 14 touches when the mounting tray 14 is in the open position and a regulating surface 80A that the back cover 19 touches when the back cover 19 is in the closed position. Therefore, the mounting tray 14 and the back cover 19 touch the regulating surfaces 80A of the common base frame 80 by which they are rotatably supported. This allows the mounting tray 14 to be accurately positioned in a limit position in an opening direction and allows the back cover 19 to be accurately positioned in a limit position in a closing direction. For this reason, the accuracy of position of the mounting tray 14 in the open position and the accuracy of position of the back cover 19 in the closed position are higher than in a configuration in which the housing 12 is provided with a regulating surface. Further, since the regulating surface 80A that determines the limit position of the mounting tray 14 in the opening direction serves also as the regulating surface 80A that determines the limit position of the back cover 19 in the closing direction, there is more advantage in space than in a configuration in which separate regulating surfaces are provided.

(11) When the mounting tray 14 is in the open position, the mounting tray 14 is located in a place to which a document D is ejected in a direction of ejection from a document ejection opening 35 of the reading unit 30. The recording apparatus 11 further includes a guide section 36 that guides upward the direction of ejection of the document D that is ejected from the document ejection opening 35 of the reading unit 30. Therefore, the document D that is ejected from the document ejection opening 35 of the reading unit 30 is guided upward by the guide section 36. This makes it possible to avoid contact between the document D thus ejected and the first edge guide 27.

(12) A widthwise position of the reading unit 30 with respect to the housing 12 is a position where an amount of misregistration between a width center of the feed opening 22 and a width center of the document feed opening 32 is equal to or smaller than ⅕ of a maximum width of the medium M that is fed from the feed opening 22. This makes it possible to keep short the width dimension of the mounting tray 14 covering both the feed opening 22 and the reading unit 30. Accordingly, the width dimension of the mounting tray 14 does not become too long for the maximum width of a medium M, and the mounting tray 14 causes no obstruction when the mounting tray 14 is opened.

(13) When the mounting tray 14 is in the closed position, the first edge guide 27 is stowed in a position which is different widthwise from that of the guide section 36 and in a state of overlapping the guide section 36 widthwise. Therefore, the first edge guide 27 is stowed in the housing 12 so as to be partially identical in position to the guide section 36 in the transport direction Y1. This makes it possible to make the recording apparatus 11 short in the transport direction Y1 and secure a long length of an extension section 27B of the first edge guide 27 that extends upward from the feed opening 22 when the mounting tray 14 is open.

It should be noted that the embodiment described above may be modified to be embodiments such as modifications hereinafter prescribed. Furthermore, a proper combination of the embodiment described above and a modification hereinafter prescribed may be a further modification, or a proper combination of modifications hereinafter prescribed may be a further modification.

Figure 18:
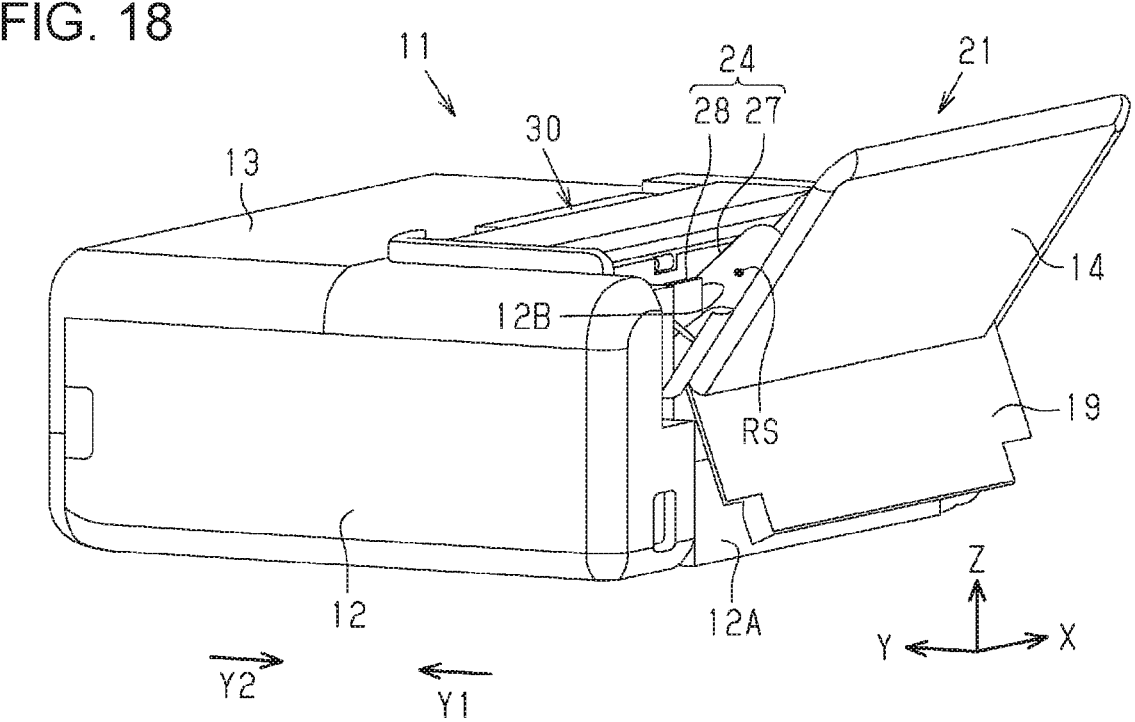
FIG. 18 is a perspective view of a recording apparatus of a modification as seen from behind.

The back cover 19 is not limited to being configured to rotate on a rotating shaft at a lower end thereof. As shown in FIG. 18, the back cover 19 may be configured to rotate on a rotating shaft at an upper end thereof. In the configuration shown in FIG. 18, the back cover 19 covers the opening 12B in a manner similar to the embodiment in a state where the mounting tray 14 is in the closed position. There is provided a cam mechanism (not illustrated) that causes the back cover 19 to open and close in tandem with the opening and closing of the mounting tray 14. The cam mechanism includes a cam and a cam follower. In a process by which the mounting tray 14 rotates from the closed position to the open position, a cam follower face engaging with a cam section at a back end of the mounting tray 14 is pressed, so that the back cover 19 moves down as the mounting tray 14 rotates. In a process by which the back cover 19 moves down, the back cover 19 moves along an oblique cam face (not illustrated) and thereby tilts to a downwardly-open posture angle at which the back cover 19 has its lower end displaced backward. The back cover 19 is biased by a spring (not illustrated) in a closing direction. Even a configuration such as the recording apparatus 11 in which the opening 12B is opened by the back cover 19 being displaced downward can cause the back cover 19 to open and close in tandem with rotation of the mounting tray 14 and therefore can bring about an effect similar to that of the embodiment. Since the back cover 19 assumes a downwardly-open posture when the mounting tray 14 is in the open position, the back cover 19 has a self-weight assist by which when the back cover 19 returns from the open position to the closed position, the weight of the back cover 19 serves as a force by which the back cover 19 rotates to the closed position. This makes it possible to reduce the size of or eliminate the need for a spring, such as a twisted spring, that biases the back cover 19 in a closing direction.

The spring that biases the back cover 19 in a closing direction is not limited to a twisted spring but may be a tension spring or a compressed spring.

The cam mechanism 81 may be one that effects rotation in one stage though the engagement of one type of cam with a cam follower. For example, only the cam shafts 82 may be used, or only the cam faces 14B may be used.

While each of the edge guides 24 is constituted by two components, namely a first edge guide 27 and a second edge guide 28, only the mounting tray 14, out of the mounting tray 14 and the hopper 26, may be provided with an edge guide member configured to move across the width of a medium M. Alternatively, only the hopper 26 may be provided with an edge guide member configured to move across the width.

The configuration in which a medium M is positioned in the center by moving the pair of edge guides 24 in an interlocked fashion may be replaced by a one-sided configuration in which one edge guide can be moved to position a medium M to a reference surface on one side widthwise. In the closed position of the cover, an end face of the one-sided edge guide member may make contact with an inner surface of the cover or face the inner surface at a distance from the inner surface.

The side surface of the housing 12, located upstream in a transport direction of a medium M, in which the opening 12B is bored is not limited to a back surface. For example, the embodiment may be configured such that a direction orthogonal to the transport direction Y1 is a transport direction, that the opening 12B is provided in a right or left side surface of the housing 12 as seen from the front, at which the operation panel 15 is provided, and that when in the open position, the mounting tray 14 is disposed on a right or left side section of the housing 12.

In the load section 44, a spring serving as an elastic member that applies a pressing force to a pressing member that presses one engaging member of the constituent members of the interlocking mechanism 25 against another member may be replaced by a piece of rubber.

In an alternative load section, one of members of the constituent members of the interlocking mechanism 25 that slide during movement of the edge guides 24 may be provided with a notch whose slide resistance applies a load to the edge guides 24.

The recording apparatus 11 may be configured not to include the reading unit 30 and may be configured such that when in the closed position, the mounting tray 14 covers only the feed opening 22.

The medium M is not limited to a sheet of paper but may be a film or sheet made of synthetic resin, cloth, unwoven cloth, a composite film (laminate sheet) of synthetic resin and metal, metal foil, a ceramic sheet, or the like.

The recording apparatus 11 is not limited to an ink-jet printer but may be an ink-jet textile printing apparatus. Alternatively, the recording apparatus 11 may be of a dot-impact recording type. Further, the recording apparatus 11 is not limited to a serial printer but may be a lateral printer, a line printer, or a page printer.

Technical ideas understood from the embodiments and the modifications are described below together with effects.

A recording apparatus includes: a medium mounting section on which a medium is mounted; a feed mechanism that feeds, through a feed opening, a medium mounted on the medium mounting section; a recording section that performs recording on a medium fed by the feed mechanism; a housing that accommodates the feed mechanism and the recording section; a reading unit, provided on top of the housing, that includes a document feed opening, a transport section that takes in a document from the document feed opening and transports the document, and a reading section that reads a document being transported; a mounting tray that constitutes the medium mounting section, the mounting tray being configured to rotate between a closed position in which the mounting tray covers the feed opening and an open position in which the mounting tray is configured to have the medium mounted thereon; an opening, bored in a side surface of the housing located upstream in a transport direction of a medium, in which the mounting tray is stowed when the mounting tray is disposed in the open position; and a cover, configured to move in tandem with the mounting tray, that moves to a closed position in which the cover covers the opening when the mounting tray is closed and an open position in which the cover does not prevent the mounting tray from rotating for stowage in the opening when the mounting tray is open. When in the closed position, the mounting tray is disposed in a state of covering the document feed opening of the reading unit.

According to this configuration, when the mounting tray is opened, the cover opens in an interlocked fashion, and when the mounting tray is closed, the cover closes in an interlocked fashion. When having rotated to the open position, the mounting tray is disposed in a state of being stowed in the opening of the housing. When the mounting tray is in the closed position, the mounting tray covers the feed opening and the document feed opening and the cover covers the opening of the housing. For example, in a case where the opening is not provided in the housing, the size of the housing in the transport direction needs to be made larger so that a portion of the mounting tray that is located on a lower level than an upper surface of the housing when the mounting tray is in the open position is stowed in the housing. On the other hand, a back surface of the housing can be located relatively downstream in the transport direction, as the mounting tray is configured to be stowed in the opening. Moreover, when the mounting tray is in the closed position, in which the mounting tray is out of the opening, the cover covers the opening, so that there is no concern for entry of dust through the opening when the recording apparatus is not in use. This makes it possible to reduce entry of dust into the housing and, at the same time, reduce the size of the recording apparatus in the medium transport direction.

In the recording apparatus, a rotating shaft of the mounting tray may be located downstream of a rotating shaft of the cover in the transport direction.

According to this configuration, when the cover is closed, the rotating shaft of the mounting tray causes no obstruction. This makes it possible to locate the cover relatively close to downstream in the transport direction. This makes it possible to reduce the size of the recording apparatus in the medium transport direction.

In the recording apparatus, when the mounting tray is in the closed position, the mounting tray and the cover may overlap each other heightwise.

According to this configuration, the cover closes into such a position as to partially overlap below the mounting tray when the mounting tray is in the closed position. This makes it possible to reduce the size of the recording apparatus in the medium transport direction.

In the recording apparatus, the mounting tray may include an edge guide member configured to move across a width of the medium, and when the cover is in the closed position, the edge guide member may have an end face that makes contact with an inner surface of the cover or faces the inner surface at a distance from the inner surface.

According to this configuration, when the mounting tray is in the closed position, bending of the cover can be reduced even when a user presses an outer surface of the cover in a closed state, as the inner surface of the cover touches the end face of the edge guide member. Therefore, a reduction in thickness of the cover is achieved by thinning or eliminating a rib that is provided to enhance the strength of the cover. The reduction in thickness of the cover can lead to a reduction in size of the recording apparatus in the medium transport direction.

The recording apparatus may further include a cam mechanism, interposed between the mounting tray and the cover, that causes the cover to rotate in tandem with rotation of the mounting tray.

According to this configuration, the cam mechanism allows the cover to rotate in tandem with rotation of the mounting tray.

The recording apparatus may further include a biasing member that biases the cover in a closing direction. The cam mechanism may include a cam provided in the mounting tray and a cam follower provided in the cover, and the cover may be configured to open in an interlocked fashion by the cam pressing the cam follower against a biasing force of the biasing member when the mounting tray opens.

According to this configuration, opening the mounting tray causes the cam to press the cam follower, whereby the cover opens in an interlocked fashion. Closing the mounting tray causes the cover to close under a biasing force of the biasing member. This makes it possible, with a simple configuration, to open and close the cover in tandem with the opening and closing of the mounting tray.

The recording apparatus may further include a rotating shaft that rotatably supports the cover. The biasing member may be a twisted spring that biases the cover in a closing direction, and the twisted spring may supported by a spindle located downstream of the rotating shaft of the cover in the transport direction.

This configuration makes it possible to shorten the dimension of the housing in the medium transport direction in which the cover can be entirely stowed in the housing without the twisted spring protruding further outward than the cover when the cover is in the closed position. This makes it possible to reduce the size of the recording apparatus in the transport direction.

In the recording apparatus, the mounting tray may include a first cam and a second cam of the mounting tray and a cam follower of the cover, and the mounting tray may open the cover in two stages consisting of a first range of rotation within which the cover is rotated from the closed position to a predetermined opening angle by the first cam engaging with the cam follower and a second range of rotation within which the cover is rotated from the predetermined opening angle to the open position by the second cam engaging with the cam follower.

According to this configuration, a configuration in which the cover is rotated by a single cam section in tandem with rotation of the mounting tray makes it necessary to keep a great distance from the rotating shaft of the mounting tray backward to the position of the cam section. On the other hand, a configuration in which the mounting tray is rotated in two stages through the use of two types of cam (i.e. the first cam and the second cam) makes it possible to dispose two types of cam section in a place at a short distance from the rotating shaft of the mounting tray backward. This makes it possible to reduce the size of the recording apparatus in the medium transport direction (i.e. the direction of depth) while ensuring a smooth rotation of the mounting tray.

In the recording apparatus, the second cam may be an outer circumferential surface of a base end section of the mounting tray located lateral to a mounting region in which a medium of a maximum width is mounted, and the cam follower may project from an inner surface of the cover so as to be positioned to engage with the outer circumferential surface.

This configuration eliminates the need to provide a dedicated cam section, thus achieving a reduction in size of the recording apparatus in the medium transport direction (i.e. the direction of depth) in addition to a simple configuration.

In the recording apparatus, the mounting tray may be rotatably supported by a frame accommodated in the housing, the cover may be rotatably supported by the frame, and the frame may have a regulating surface that the mounting tray touches when the mounting tray is in the open position and a regulating surface that the cover touches when the cover is in the closed position.

According to this configuration, the mounting tray and the cover touch the regulating surfaces of the common base frame. This allows the mounting tray to be accurately positioned in a limit position in an opening direction and allows the cover to be accurately positioned in a limit position in a closing direction. Further, since the regulating surface that determines the limit position of the mounting tray in the opening direction serves also as the regulating surface that determines the limit position of the cover in the closing direction, there is more advantage in space.

In the recording apparatus, when the mounting tray is in the open position, the mounting tray may be located in a place to which a document is ejected in a direction of ejection from an ejection opening of the reading unit, and the recording apparatus may further include a guide section that guides upward the direction of ejection of the document that is ejected from the ejection opening of the reading unit.

According to this configuration, the document that is ejected from the ejection opening of the reading unit is guided upward by the guide section. This makes it possible to avoid contact between the document thus ejected and the first edge guide.

In the recording apparatus, a widthwise position of the reading unit with respect to the housing may be a position where an amount of misregistration between a width center of the feed opening and a width center of the document feed opening is equal to or smaller than $\frac{1}{5}$ of a maximum width of the medium that is fed from the feed opening.

This configuration makes it possible to keep short the width dimension of the mounting tray covering both the feed opening and the document feed opening. Accordingly, the width dimension of the mounting tray does not become too long for the maximum width of a medium, and the mounting tray causes no obstruction when the mounting tray is opened.

What is claimed is:
1. A recording apparatus comprising:
a medium mounting section on which a medium is mounted;
a feed mechanism that feeds the medium through a feed opening;
a recording section that performs recording on the medium fed by the feed mechanism;
a housing that accommodates the feed mechanism and the recording section;
a reading unit, provided on top of the housing, that includes a document feed opening, a transport section that takes in a document from the document feed opening and transports the document, and a reading section that reads a document being transported;
a mounting tray that constitutes the medium mounting section, the mounting tray being configured to rotate between a closed position in which the mounting tray covers the feed opening and an open position in which the mounting tray is configured to have the medium mounted thereon;
an opening, bored in a side surface of the housing located upstream in a transport direction of a medium, in which the mounting tray is stowed when the mounting tray is in the open position; and
a cover, configured to move in tandem with the mounting tray, that moves to a closed position in which the cover covers the opening when the mounting tray is closed and an open position in which the cover does not prevent the mounting tray from rotating for stowage in the opening when the mounting tray is open, wherein when in the closed position, the mounting tray is disposed in a state of covering the document feed opening of the reading unit.

2. The recording apparatus according to claim 1, wherein a rotating shaft of the mounting tray is located downstream of a rotating shaft of the cover in the transport direction.

3. The recording apparatus according to claim 1, wherein when the mounting tray is in the closed position, the mounting tray and the cover overlap each other heightwise.

4. The recording apparatus according to claim 1, wherein the mounting tray includes an edge guide member configured to move across a width of the medium, and when the cover is in the closed position, the edge guide member has an end face that makes contact with an inner surface of the cover or faces the inner surface at a distance from the inner surface.

5. The recording apparatus according to claim 1, further comprising a cam mechanism, interposed between the mounting tray and the cover, that causes the cover to rotate in tandem with rotation of the mounting tray.

6. The recording apparatus according to claim 5, further comprising a biasing member that biases the cover in a closing direction, wherein the cam mechanism includes a cam provided in the mounting tray and a cam follower provided in the cover, and the cover is configured to open in an interlocked fashion by the cam pressing the cam follower against a biasing force of the biasing member when the mounting tray opens.

7. The recording apparatus according to claim 6, further comprising a rotating shaft that rotatably supports the cover, wherein the biasing member is a twisted spring that biases the cover in a closing direction, and the twisted spring is supported by a spindle located downstream of the rotating shaft of the cover in the transport direction.

8. The recording apparatus according claim 6, wherein the mounting tray includes a first cam and a second cam as the cam, and the mounting tray opens the cover in two stages consisting of a first range of rotation within which the cover is rotated from the closed position to a predetermined opening angle by the first cam pressing the cam follower and a second range of rotation within which the cover is rotated from the predetermined opening angle to the open position by the second cam pressing the cam follower.

9. The recording apparatus according to claim 8, wherein the second cam is an outer circumferential surface of a base end section of the mounting tray located lateral to a mounting region in which a medium of a maximum width is mounted, and the cam follower projects from an inner surface of the cover so as to be positioned to engage with the outer circumferential surface.

10. The recording apparatus according to claim 1, wherein the mounting tray is rotatably supported by a frame accommodated in the housing, the cover is rotatably supported by the frame, and the frame has a regulating surface that the mounting tray touches when the mounting tray is in the open position and a regulating surface that the cover touches when the cover is in the closed position.

11. The recording apparatus according to claim 1, wherein when the mounting tray is in the open position, the mounting tray is located in a place to which a document is ejected in a direction of ejection from an ejection opening of the reading unit, the recording apparatus further comprising a guide section that guides upward the direction of ejection of the document that is ejected from the ejection opening of the reading unit.

12. The recording apparatus according to claim 1, wherein a widthwise position of the reading unit with respect to the housing is a position where an amount of misregistration between a width center of the feed opening and a width center of the document feed opening is equal to or smaller than $1/5$ of a maximum width of the medium that is fed from the feed opening.

* * * * *